United States Patent

Choudhary et al.

[11] Patent Number: 6,087,545
[45] Date of Patent: Jul. 11, 2000

[54] PROCESS FOR OXIDATIVE CONVERSION

[75] Inventors: Vasant Ramchandra Choudhary; Balu Shivaji Uphade; Shafeek Abdul Rashid Mulla, all of Maharashtra, India

[73] Assignee: Council of Scientific & Industrial Research, New Delhi, India

[21] Appl. No.: 08/892,210

[22] Filed: Jul. 14, 1997

Related U.S. Application Data

[62] Division of application No. 08/462,671, Jun. 5, 1995, Pat. No. 5,712,217.

[30] Foreign Application Priority Data

Mar. 31, 1994 [IN] India ......................................... 370/94
Mar. 31, 1994 [IN] India ......................................... 371/94
Mar. 31, 1994 [IN] India ......................................... 372/94

[51] Int. Cl.⁷ .............................. C07C 4/06; C07C 5/333
[52] U.S. Cl. .................... 585/658; 585/651; 585/652; 585/653; 585/654; 585/661
[58] Field of Search .................... 585/651, 652, 585/653, 654, 658, 661

[56] References Cited

U.S. PATENT DOCUMENTS 4,822,944  4/1989  Brazdil, Jr. et al. .................... 585/500
5,712,217  1/1998  Choudhary et al. .................... 502/303

OTHER PUBLICATIONS

J.B. Kimble, et al. "Playing Matchmaker . . ." Chemtech 1987, pp. 500–505 no month.
J.A. Safranko, et al. "The Oxidative Conversion . . ." Journal of Catalysis 103 302–310 (1987) no month.
C.A. Jones, et al. "The Oxdative Conversion . . ." Journal of Catalysis 103, 311 (1987) no month.
C.A. Jones, et al. "Fuels For The Future . . ." Journel of Energy & Fuels, 1987, 1, 12, pp. 12–16 no month.

*Primary Examiner*—Michael Lewis
*Assistant Examiner*—Alexander G. Ghyka
*Attorney, Agent, or Firm*—Ladas & Parry

[57] ABSTRACT

An improved supported catalyst containing mixed strontium and other alkaline earth oxides deposited on a sintered low surface area porous catalyst carrier (or support) precoated with mixed lanthanum and other rare earth oxides, represented by the formula:

$$A_a SrO_b \,(x) / R_c LaO_d \,(y) / S,$$

wherein, A is alkaline earth element selected from Be, Mg, Ca, Ba or a mixture thereof; Sr is strontium, O is oxygen; R is rare earth element selected from Ce, Nd, Pm, Sm, Eu, Gd, Tb, Dy, Ho, Er, Tm, Yb, Lu or a mixture thereof; La is lanthanum; S is catalyst support selected from sintered low surface area porous refractory inert solids comprising of alumina, silica, silica-alumina, silicon carbide, zirconia, hafnia or a mixture thereof; a is A/Sr mole ratio in the range of about 0.01 to about 10; b is number of oxygen atoms needed to fulfill the valence requirement of alkaline earth elements ($A_a$ Sr); c is R/La mole ratio in the range of about 0.01 to about 10; d is number of oxygen atoms needed to fulfill the valence requirement of rare earth elements, ($R_c$La); y is weight percent loading of rare earth oxides ($R_c LaO_d$) precoated on the support in the range of about 0.5 wt % to about 50 wt % and x is wt % loading of alkaline earth oxides ($A_a SrO_b$) deposited on the precoated support in the range of about 0.4 wt % to about 40 wt %.

18 Claims, No Drawings

PROCESS FOR OXIDATIVE CONVERSION

This is a division of copending application(s) of Ser. No. 08/462,671 filed on Jun. 5, 1995, now U.S. Pat. No. 5,712,217.

This invention relates to an improved supported catalyst prepared by the deposition of mixed strontium and other alkaline earth oxides on a sintered low surface area porous catalyst carrier (i.e. support) precoated with mixed lanthanum and other rare earth oxides. Catalyst prepared by the process of the present invention is useful for the oxidative conversion of methane or natural gas to ethylene, ethane and higher hydrocarbons ($C_3$+hydrocarbons) and also for the oxidative dehydrogenation of ethane or $C_2$–$C_4$ alkanes.

More particularly, the invention relates to a process for the preparation of an improved supported catalyst with mixed lanthanum and other rare earth oxides. This invention particularly relates to a process for the oxidative conversion of methane or natural gas to ethylene and higher hydrocarbon and for the oxidative conversion of ethane of $C_2$–$C_4$ paraffins to ethylene and higher olefins (propylene and butylenes) employing the improved supported catalyst diluted with an inert solid.

The process of manufacture of the improved catalyst could be used by catalyst manufactures and by the producers of higher hydrocarbons (i.e. $C_2$+-hydrocarbons) from methane and of ethylene and other lower olefins (i.e. propylenes and butylenes) from methane, natural gas, ethane-propane mixtures, propane and butanes.

BACKGROUND OF THE INVENTION

In the prior art, use of a number of catalysts in the oxidative coupling of methane to $C_2$-hydrocarbons (i.e. ethane and ethylene) and in the oxidative dehydrogenation of $C_2$–$C_4$ alkanes is known.

At present, ethylene, which is a keystone to the petrochemicals, from light paraffins ($C_2$–$C_4$ paraffins) is produced commercially by a well established process based on the thermal cracking of ethane or $C_2$–$C_4$ paraffins at 750°–1000° C. The cracking process is highly endothermic and involves coke deposition (L. Kniel, O. Winter and K. Stork in Chemical Industries, Vol. 2 "Ethylene: Key-Stone to the Petrochemical Industry, Marcel Dekkor, Inc., New York and Basel). Typical results given in the above reference indicate that at 50% and 60% conversion of ethane with 83.3% and 80.0% selectivity for ethylene, respectively, could be obtained by the thermal cracking of ethane.

The process for production of ethylene, based on thermal cracking of light paraffins have following limitations: (1) They are highly endothermic and hence are energy intensive, (2) They involve extensive coke deposition inside the pyrolysis reactor tubes, thus causing increase in pressure drop and frequent break downs.

Catalytic processes based on oxidative dehydrogenation of ethane or light paraffins are also known in the prior art. A number of catalysts containing low melting compounds such as alkali metal compounds, metal halides and other low melting metal oxides are known for the oxidative dehydrogenation of ethane or lower alkanes (Ref. Eastman and Kolts, U.S. Pat. No. 4,310,717 (1982); Eastman, U.S. Pat. No. 4,368,346 (1983); Eastman and Kimble, U.S. Pat. No. 4,450,313 (1985); Kimble, U.S. Pat. No. 4,476,344 (1984); Eastman et al., U.S. Pat. No. 4,497,971 (1985); Jpn. Kokai Tokyo Koho JP 61,282,322 (1986); Kolts and Guillory, Eur. Pat. Appl EP 205,765 (1986). Because of the presence of the low melting or volatile component, these catalysts are deactivated during the process due to the loss of active components from the catalyst by evaporation at hot spots and/or due to the catalyst sintering.

Methane is a major constituent of natural gas and also of bio-gas. Processed natural gas typically comprises a major amount of methane and minor amounts of ethane, propane, butanes, $CO_2$ and nitrogen and very small amount of pentanes. Methane or natural gas is used principally as a source of heat in commercial, industrial and residential services and also a source of hydrogen for the fertilizer industries and syngas (CO and $H_2$) for the production of methanol and in the Fischer-Tropcsh synthesis. World reserves of natural gas are constantly being upgraded and more and more natural gas is being discovered than oil. Because of the problem associated with transportation of a very large volume of natural gas, most of the natural gas produced particularly at remote places is flared. This causes not only a wastage of valuable energy but also causes a global warming due to release of large amount of $CO_2$ in the atmosphere. If energy efficient commercially feasible processes were available for converting methane or natural gas into value added products like ethylene and other lower olefins, which can be converted to easily transportable petrochemicals and liquid hydrocarbons by known processes, this can have far reaching economic impact and also the exploration of more gas-rich fields could greatly increase the natural gas reserves.

Researchers at Atlantic Richfield Co. (USA) patented a series of supported reducible metal oxides, such as oxides of Mn, Bi, Ge, In, Pb, Sb, Sn and Pr with or without alkali metals supported on $SiO_2$ or MgO, as catalysts for the oxidative conversion of methane to ethane and ethylene, utilising a so-called "Redox" approach, which use lattice oxygen from the catalyst to perform the oxidative coupling of methane to $C_2$-hydrocarbons at about 800° C. and gas hourly space velocity of about 860 $h^{-1}$ (Ref. Jones and Co-workers, J. Catal., 103, 302–319 (1987); Jones et.al., Energy and fuels, 1, 12–16 (1987); Jones et.al., U.S. Pat. Nos. 4,443,644; 4,443,645; 4,443,646; 4,443,647; 4,443,648; 4,443,649; 4,443,649; 4,499,322; 4,444,984 (1984); 4,495,347; 4,517,398 (1985); Withers, et. al, U.S. Pat. No. 4,634,800 (1987); Sofranko and Jones, U.S. Pat. No. 4,544,784 (1987). These catalysts are based on reducible metal oxides and are used in a stoichiometric fashion by atlernatively exposing them to an oxidising atmosphere and then to methane in the absence of free oxygen. The main drawbacks of the processes using reducible metal oxides as catalysts following "Redox" approach in the oxidative conversion of methane are as follows:

(i) The "Redox" operation is very complicated and requires a complicated reactor consisting of physically separate zones for a methane contacting step and for an oxygen contacting step, with an arrangement for recirculating the catalyst between two zones.

(ii) Because of the "Redeox" operation and requirement of lower space velocity of methane to achieve reasonable methane conversion, the productivity of ethane and ethylene is very low.

(iii) The "Redox" catalyst without containing alkali metals showed very poor activity and selectivity in the oxidative methane coupling process; whereas the alkali metal containing catalysts showed good activity and selectivity but the alkali metal containing catalysts are expected to be deactivated fast because of the evaporation of alkali metals and also due to the catalyst sintering during the high temperature process operation.

A number of alkali metal promoted catalysts, such as alkali metal containing alkaline earth metal oxides, group III and IV metal oxides and the catalysts containing low melting metal compounds have been described for the oxidative conversion of methane to $C_2$-hydrocarbons in presence of free oxygen (Ref. Kimble and Kolts, Chemtech, 501 (1987); Baerns et. al., U.S. Pat. No. 4,608,449 (1986); Leyshon et.al., U.S. Pat. No. 4,801,762 (1989); Devries et. al., U.S. Pat. No. 4,814,538 (1989); Kimble et. al., U.S. Pat. No. 5,087,787 (1992); Lunsford and Hinson, U.S. Pat. No. 5,041,405 (1991). The main drawback of the use of these catalysts in the oxidative conversion of methane to higher hydrocarbons are that the catalysts are deactivated during the process because of the loss of active components from the catalyst by evaporation and also due to sintering of the catalysts during their operation in the high temperature process.

Recently in U.S. Pat. No. 4,822,944 (1989) Brazdil Jr., et.al. have disclosed a novel oxidative methane coupling catalyst, having melting points above 900° C., represented by the formula: $SrLa_nO_x$, wherein n is a number in the range of about 0.1 to about 100, and x is the number of oxygens needed to fulfil the valence requirements of the other elements. The catalyst is prepared generally by mixing an aqueous solution of compounds containing the metal components, forming a precipitate, drying this precipitate and calcining to produce desirable physical properties. Although, the catalyst disclosed by Brazdil Jr. et.al. has high thermal stability against evaporation of active catalyst component during the oxidative methane coupling process occurring at high temperature (at about 900° C.), the catalyst shows poor activity and also poor selectivity in the oxidative coupling of methane; for example, at the catalyst temperature of 915°–916° C. and the gas hourly space velocity of 23,570 $cm^3.g^{-1}.h^{-1}$, the methane conversion, $C_2+$ yield and $C_2+$ selectivity are 14.2–14.6%, 8.7–9.1% and 61.2–62.8% respectively. Further the catalyst operates in the oxidative methane coupling process at high temperature about 900° C. and yet shows very poor catalytic activity. Hence, there is a need to develop an improved catalyst which is not only thermally stable at high temperature but also highly active and selective in the oxidative coupling of methane to higher hydrocarbons.

The price of methane or natural gas is high and it is increasing day-by-day because of energy crisis. Hence, the oxidative conversion of methane or natural gas to ethylene will be economically feasible only if the selectivity and productivity for ethylene in the conversion process are high and when process is operated continuously for a long period without catalyst deactivation and/or fouling due to a loss of catalytic activity or mechanical strength. In the oxidative conversion of methane to ethylene, two methane molecules are coupled to form ethane which is then dehydrogenated to ethylene. Therefore, in order to make catalytic oxidative methane-or natural gas-to-ethylene conversion process economically feasible and/or competitive to the conventional processes used for the production of ethylene, there is a need to use an improved catalyst, preferably an improved supported catalyst, which is thermally and hydrothermally stable at the process operating conditions, has high mechanical strength and has high activity and productivity with very high selectivity not only in the oxidative coupling of methane to ethane but also in the oxidative dehydrogenation of ethane to ethylene, and also has long life in the process.

The present invention is directed to overcome the limitations and drawbacks of the earlier catalysts thereby providing a novel improved supported catalyst.

The objective of the invention is to provide an improved supported catalyst comprising strontium and rare earth oxides deposited on a sintered low surface area porous catalyst carrier (or support).

Another objective of the invention is to provide an improved supported catalyst having higher activity, selectivity and efficiency (or productivity) in the oxidative coupling of methane to higher hydrocarbons ($C_2+$-hydrocarbons) in the presence of free oxygen without catalyst deactivation or fouling during the process.

The other objective of the invention is to provide an improved supported catalyst having high activity, selectivity and productivity in the oxidative conversion of natural gas to ethylene and other lower olefin (i.e. propylene and butylenes) and in the oxidative dehydrogenation of ethane and other lower alkanes (i.e. propane and butanes) to the corresponding olefin and also has high thermal and hydrothermal stability during the operation of these oxidative methane, natural gas and lower alkanes conversion processes.

Another objective of the present invention is to provide a process for the manufacture of an improved supported catalyst.

Another objective of the present invention is to provide an improved supported catalyst which operates at a temperature below 900° C. with higher activity, selectivity and productivity useful for the oxidative coupling of methane to higher hydrocarbons.

Another objective of the present invention is to provide higher energy efficient and safe process for oxidative conversion of methane or natural gas to ethylene, ethane and higher hydrocarbons and for the oxidative dehydrogenation of ethane of $C_4$—$C_4$ alkanes to ethylene and higher olefins employing the improved catalyst of this invention.

SUMMARY OF THE INVENTION

This invention provides an improved supported catalyst, containing mixed strontium and other alkaline earth oxides deposited on a sintered low surface area porous catalyst carrier (or support) precoated with mixed lanthanum and other rare earth oxides, represented by the formula:

$A_a SrO_b$ (x) /$R_c LaO_d$ (y) / S, wherein, A is alkaline earth element selected from Be, Mg, Ca, Ba or a mixture thereof; Sr is strontium; O is oxygen; R is rare earth element selected from Ce, Nd, Pm, Sm, Eu, Gd, Tb, Dy, Ho, Er, Tm, Yb, Lu or a mixture thereof; La is lanthanum; S is catalyst support selected from sintered low surface area porous refractory inert solids comprising of alumina, silica, silica-alumina, silicon carbide, zirconia, hafnia or a mixture thereof; a is A/Sr mole ratio in the range of about 0.01 to about 10; b is number of oxygen atoms needed to fulfil the valence requirement of alkaline earth elements ($A_a$ Sr); c is R/La mole ratio in the range of about 0.01 to about 10; d is number of oxygen atoms needed to fulfil the valence requirement of rare earth elements, ($R_c$La); y is weight percent loading of rare earth oxides ($R_c LaO_d$) precoated on the support in the range of about 0.5 wt % to about 50 wt % and x is wt % loading of alkaline earth oxides ($A_a SrO_b$) deposited on the precoated support in the range of about 0.4 wt % to about 40 wt %.

In accordance with the present invention there is also provided a process for the preparation of an improved supported catalyst, containing mixed strontium and other alkaline earth oxides deposited on a sintered low surface area porous catalyst carrier (or support) precoated with mixed lanthanum and other rare earth oxides represented by the general formula:

$A_a SrO_b$ (x) /$R_c LaO_d$(y) /S.

The present invention also provides an important process for the oxidative conversion of methane or natural gas to ethylene, ethane and higher hydrocarbons using the improved support catalyst defined above.

The present invention also provides an improved process for the oxidative conversion of ethane or $C_2$–$C_4$ paraffins to ethylene and higher olefins (propylenes and butylenes). All the above improved process of this invention involve simultaneous occurrence of exothermic and endothermic hydrocarbon conversion reaction thus making them most energy efficient and safe to operate requiring little or no external energy.

DETAILED DESCRIPTION OF THE INVENTION

In accordance with the present invention there is also provided a process for the preparation of an improved supported catalyst, containing mixed strontium and other alkaline earth oxides deposited on a sintered low surface area porous catalyst carrier (or support) precoated with mixed lanthanum and other rare earth oxides, represented by the general formula:

$$A_a SrO_b \text{ (x) } /R_c LaO_d(y) /S,$$

wherein, A is alkaline earth element selected from Be, Mg, Ca, Ba or a mixture thereof; Sr is strontium; O is oxygen; R is rare earth element selected from Ce, Nd, Pm, Sm, Eu, Gd, Tb, Dy, Ho, Er, Tm, Yb, Lu or a mixture thereof; La is lanthanum; S is catalyst support selected from sintered low surface area porous refractory inert solids comprising of alumina, silica, silica-alumina, silicon carbide, zirconia, hafnia or a mixture thereof; a is A/Sr mole ratio in the range of about 0.01 to about 10; b is number of oxygen atoms needed to fulfil the valence requirement of alkaline earth elements ($A_a$ Sr); c is R/La mole ratio in the range of about 0.01 to about 10; d is number of oxygen atoms needed to fulfil the valence requirement of rare earth elements, ($R_c$La); y is weight percent loading of rare earth oxides ($R_c LaO_d$) precoated on the support in the range of about 0.5 wt % to about 50 wt % and x is wt % loading of alkaline earth oxides ($A_a SrO_b$) deposited on the precoated support in the range of about 0.4 wt % to about 40 wt %, useful for the oxidative coupling of methane to higher hydrocarbons (i.e. $C_2$+- hydrocarbons), oxidative conversion of natural gas to ethylene and other lower olefins (propylene and butylenes) and for the oxidative dehydrogenation of ethane or $C_4$—$C_4$ alkanes to corresponding olefins, in the presence of free oxygen, which comprises:

(i) precoating of the surface of the support by the deposition of $R_c LaO_d$ on it by impregnating or coating the support with the mixed compounds of lanthanum and other rare earth elements, represented by the general formulae: $LaY_g$ and $RY_g$, respectively, wherein La is lanthanum, R is rare earth element selected from Ce, Nd, Pm, Sm, Eu, Gd, Tb, Dy, Ho, Er, Tm, Yb, Lu or a mixture thereof, Y is an anion selected from nitrate, acetrate, formate, oxalate, hydroxide, oxide and carbonate anion, g is number of Y needed to fulfil the valence requirement of lanthanum and other rare earth elements in their compounds, which on decomposition converts into oxide form, with R/La mole ration, c, in the range of about 0.01 to about 10 and in quantities sufficient to obtain a loading of $R_c LaO_d$ on support in the range of about 0.5 wt % to about 50 wt %, by the known incipient wetness impregnation, wet impregnation or coating methods, followed by drying the wet mass by heating it in air or under vacuum first slowly at about 60° C. for about 5 h and then at about 110° C. for about 2 h, and then decomposing the dried mass by heating it in air or inert gas or under vacuum at a temperature in the range of about 400° C. to about 700° C. for a period in the range of about 0.5 h, to about 15 h and finally calcining it at a temperature in the range of about 600° C. to about 1200° C. in air or inert gas or under vacuum for a period in the range of about 0.2 h to about 20 h to obtain the support precoated with the rare earth oxides ($R_c LaO_d$), and (ii) deposition of $A_a SrO_b$ on the surface of the precoated support by impregnating or coating it with mixed compounds of strontium and other alkaline earth elements, represented by the general formulae: $SrX_f$ and $AX_f$, respectively, wherein Sr is strontium, A is alkaline earth element selected from Be, Mg, Ca, Ba or a mixture thereof, X is an anion selected from nitrate, acetate, formate, oxalate, oxide, carbonate and hydroxide anion, f is a number of X needed to fulfil the valence requirement of strontium and other alkaline earth elements in their compounds, which on decomposition convert into the oxide form, with A/Sr mole ration, a, in the range of 0.01 to about 10 and in quantities sufficient to obtain a loading of $A_a SrO_b$ on the precoated support in the range of about 0.4 wt % to about 40 wt % by the known incipient wetness impregnation, wet impregnation or coating methods, followed by drying slowly the wet catalyst mass by heating it in air or under vacuum at about 60° for about 5 h and further at about 110° C. for about 2 h, and then decomposing the dried catalyst mass by heating it in air or inert gas or under vacuum at a temperature in the range of about 400° C. to about 700° C. for a period in the range of about 0.5 h to about 15 h and finally calcining it in air, inert gas or under vacuum at a temperature in the range of about 600° C. to about 1200° C. for a period in the range of about 0.2 h to about 20 h. The support used in the preparation of an improved catalyst of this invention is in the form of granules (or aggregates) of size in the range of about 0.1 mm to about 8 mm or in the form of spheres, cylindrical pellets, rings, saddles or star of size or diameter in the range of about 1 mm to about 15 mm, or in the form of monolith, and has surface area, pore volume and porosity in the range from about 0.001 $m^2.g^{-1}$ to about 5.0 $m^2.g^{-1}$, about 0.02 $cm^3.g^{-1}$ to about 0.6 $cm^3.g^{-1}$ and about 5% to about 75% respectively.

In accordance with the present invention there is also provided a process for the oxidative conversion of methane or natural gas to ethylene, ethane and higher hydrocarbons, operating in a most energy efficient and safe manner by allowing the endothermic hydrocarbon cracking reactions to occur simultaneously with the exothermic hydrocarbon oxidation reactions in a fixed diluted-catalyst bed reactor, using an improved supported catalyst, containing mixed strontium and other alkaline earth oxides deposited on a sintered low surface area porous inert support precoated with mixed lanthanum and other rare earth oxides, represented by the general formula:

$$A_a SrO_b \text{ (x) } /R_c LaO_d(y) /S,$$

wherein, A is alkaline earth element selected from Be, Mg, Ca, Ba or a mixture thereof; Sr is strontium; O is oxygen; R is rare earth element selected from Ce, Nd, Pm, Sm, Eu, Gd, Tb, Dy, Ho, Er, Tm, Yb, Lu or a mixture thereof; La is lanthanum; S is catalyst support selected from sintered low surface area porous refractory inert solids comprising of alumina, silica, silica-alumina, silicon carbide, zirconia, hafnia or a mixture thereof; a is A/Sr mole ratio in the range of about 0.01 to about 10; b is number of oxygen atoms needed to fulfil the valence requirement of alkaline earth elements ($A_a$ Sr); c is R/La mole ratio in the range of about 0.01 to about 10; d is number of oxygen atoms needed to fulfil the valence requirement of rare earth elements, ($R_c$La); y is weight percent loading of rare earth oxides ($R_c LaO_d$) precoated on the support in the range of about 0.5 wt % to about 50 wt wt % and x is wt % loading of alkaline earth oxides ($A_a SrO_b$) deposited on the precoated support in the range of about 0.4 wt % to about 40 wt % which comprises:

(a) mixing oxygen with methane or natural gas at ambient temperature or below its ignition temperature.

(b) preheating steam and the mixture of oxygen and methane or natural gas to a temperature between about 550° C. and about 850° C.

(c) admixing said preheated steam with said preheated mixture of oxygen and methane or natural gas, (d) passing continuously the resulting admixture feed over the said improved supported catalyst defined above diluted with the said inert solid (i.e. catalyst diluent) with the volume ratio of catalyst diluent to catalyst between about 0.5 and about 500 in a fixed reactor, maintaining the mole ratio of organic carbon (i.e. carbon in hydrocarbon) to oxygen and steam in said admixture feed between about 3 and about 90 and between about 0.1 and about 100, respectively, a gas hourly space velocity of said admixture feed between about $5 \times 10^3$ $cm^3 g^{-1}$ catalyst.$h^{-1}$ and about $1 \times 10^6$ $cm^3.g^{-1}$ catalyst.$h^{-1}$, a reaction temperature between about 700° C. and about 1000° C. and a pressure between about 1 atm and about 50 atm and separating the components of effluent product gases by known methods and recycling the unconverted reactants.

In accordance with the present invention there is also provided a process for the oxidative conversion of ethane or $C_2$–$C_4$ paraffins to ethylene and higher olefins (propylene and butylenes), operating in a most energy efficient and safe manner by allowing the endothermic hydrocarbon cracking reactions to occur simultaneously with the exothermic hydrocarbon oxidation reactions in a fixed diluted-catalyst bed reactor in the presence of free oxygen and steam, using the improved supported catalyst, containing mixed strontium and other alkaline earth oxides deposited on a sintered low surface area porous inert support precoated with mixed lanthanum and other rare earth oxides, represented by the general formula:

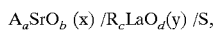
$A_a SrO_b$ (x) /$R_c LaO_d$(y) /S, wherein, A is alkaline earth element selected from Be, Mg, Ca, Ba or a mixture thereof; Sr is strontium; O is oxygen; R is rare earth element selected from Ce, Nd, Pm, Sm, Eu, Gd, Tb, Dy, Ho, Er, Tm, Yb, Lu or a mixture thereof; La is lanthanum; S is catalyst support selected from sintered low surface area porous refractory inert solids comprising of alumina, silica, silica-alumina, silicon carbide, zirconia, hafnia or a mixture thereof; a is A/Sr mole ratio in the range of about 0.01 to about 10; b is number of oxygen atoms needed to fulfil the valence requirement of alkaline earth elements ($A_a$ Sr); c is R/La mole ratio in the range of about 0.01 to about 10; d is number of oxygen atoms needed to fulfil the valence requirement of rare earth elements, ($R_c$La); y is weight percent loading of rare earth oxides ($R_c LaO_d$) precoated on the support in the range of about 0.5 wt % to about 50 wt % and x is wt % loading of alkaline earth oxides ($A_a SrO_b$) on the precoated support in the range of about 0.4 wt % to about 40 wt %, the said catalyst is diluted with an inert porous or non-porous refractory solid comprising of fused or highly sintered alumina, magnesia, silica, silica-alumina, silicon carbide, calcium oxide, zirconia, hafnia or a mixture thereof, the process comprises:

(a) mixing of oxygen or air with enriched oxygen and ethane or $C_2$–$C_4$ paraffins at ambient temperature or below its ignition temperature, (b) preheating steam and the mixture of oxygen or air enriched with oxygen and ethane or $C_2$–$C_4$ paraffins to a temperature between about 550° C. and about 850° C.

(c) admixing said preheated steam with said preheated mixture of oxygen or air enriched with oxygen and ethane or $C_2$–$C_4$ paraffins, (d) passing continuously the resulting admixture feed over the said improved supported catalyst diluted with the said inert solid (i.e. catalyst diluent); with the volume ratio of catalyst diluent to catalyst between about 0.05 and about 500 in a fixed bed reactor, maintaining the mole ratio of hydrocarbon to oxygen and steam in said admixture feed between about 2.5 and about 75 and between about 0.1 and about 10, respectively, a gas hourly space velocity of said admixture feed between about $5 \times 10^2$ $cm^3.g^1$ catalyst.$h^{-1}$ and about $6 \times 10^5$ $cm^3 g.^{-1}$ catalyst.$h^{-1}$, a reaction temperature between about 600° C. and about 1000° C. and a pressure between about 0.5 atm and about 7.5 atm and cooling and separating the components of effluent product games by known methods and recycling the unconverted reactants.

The preferred other rare earth element, R, is Ce, Nd, Sm, Eu, Gd, Yb, or a mixture thereof. The preferred other alkaline earth element, A, is Mg, Ca or a mixture thereof. The preferred A/Sr mole ratio, a, is in the range of bout 0.01 to about 1.0. The preferred loading of $A_a SrO_b$ on the precoated support, x, is in the range of about 2.5 wt % to bout 25 wt %. The preferred R/La mole ratio, c, is in the range of about 0.01 to about 1.0. The preferred loading of $R_c LaO_d$ on support, y, is in the range from about 3.0 wt % to about 30 wt %. The preferred anion, Y, in the compounds $LaY_g$ and $RY_g$, is nitrate anion or acetate anion. The preferred anion, X, in the compounds $SrX_f$ and $AX_f$, is nitrate anion or acetate anion. The preferred known method used for the precoating of support with the compounds of lanthanum and other rare earth elements and also for the deposition of the compounds of strontium and other alkaline earth elements, is the impregnation of soluble compounds from their solution on the surface of catalyst support by the incipient wetness method or the wet impregnation method. The preferred calcination temperature of the precoated support and the supported catalyst is in the range of about 800° C. to about 1000° C. The preferred gas atmosphere for the calcination of the precoated support and the supported catalyst is air.

Because of the use of sintered low surface area inert porous support made-up of refractory material in the catalyst preparation, the chemical interactions of the catalyst components with the support are eliminated or greatly reduced and also the supported catalyst has very high thermal stability, mechanical strength and attrition resistance. The surface area, porosity and texture of the support are not influenced or influenced only to a very small extent during the calcination and operation of the supported catalyst at high temperatures.

The precoating of the support with the rare earth oxides in step (i) of the catalyst preparation is very important. Because of the precoating, a layer of the rare earth oxides exists between the support and the alkaline earth oxides and therefore a direct contact and consequently the chemical interactions between the support and the alkaline earth metal oxides are avoided or greatly reduced. Another important role of the precoating is to provide more surface for the dispersion of the alkaline earth metal oxides and also to provide resistance against sintering to the catalytically active components during the long operation of the catalyst, when SrO with other alkaline earth oxides is deposited directly on the support, the resulting catalyst shows every poor activity, selectivity and productivity in the oxidative coupling of methane to higher hydrocarbons.

Because of the incorporation of other alkaline earth and rare earth elements along with strontium and lanthanum, respectively, in the catalyst, a synergetic effect causing an enhancement in the catalytic activity, selectivity and productivity is produced due to presence of strontium and other alkaline earth metal oxides together and/or the presence of lanthanum and other rare earth oxides together in the catalyst.

The slow drying of wet mass in both the catalyst preparation steps is important because when the wet mess is dried first slowly at about 60° C. and then at higher temperature at about 110° C. the distribution of the supported components is uniform throughout the catalyst.

The product obtained from the process of this invention is an improved supported catalyst comprising of strotium oxide with other alkaline earth oxides, deposited on a sintered low surface area porous inert support precoated with the oxices of lanthanum and other rare earth elements, useful for the oxidative coupling of methane to higher hydrocarbons (i.e. $C_2$+—hydrocarbons), oxidative conversion of natural gas to ethylene and other lower olefins (propylene and butylenes) and also for the oxidative dehydrogenation of ethane or lower alkanes ($C_2$–$C_4$ alkanes) to $C_2$–$C_4$ olefins, in the presence of free oxygen (i.e. gaseous oxygen). The catalyst is generally not reducible and also it is thermally and hydrothermally very stable under the operating conditions of these processes.

In the oxidative conversion of ethane or $C_2$–$C_4$ alkanes to ethylene and higher olefins at 700°–900° C., following exothermic and endothermic reactions can occur.

Exothermic Reactions (a) Oxidative dehydrogenation of ethane or $C_2$–$C_4$ alkanes $$C_2H_5+0.5O_2 \rightarrow C_2H_4+H_2O+25.1 \text{ Kcal} \tag{1}$$

Hr=−25.1 Kcal.mol⁻ of $C_2H_6$
or $$C_nH_{2n+2}+0.5O_2 \rightarrow C_nH_{2n}+H_2O+\text{heat} \tag{2}$$

(b) Combustion of ethane or $C_2$–$C_4$ paraffins, which is a highly exothermic reaction $$C_2H_6+3.5O_2 \rightarrow 2CO_2+3H_2O+341.5 \text{ Kcal} \tag{3}$$

Hr=−34.5 Kcal.mol⁻ of ethane $$C_2H_6+2.5O_2 \rightarrow 2CO+3H_2O+206.6 \text{ Kcal} \tag{4}$$

Hr=−206.6 Kcal.mol¹ of ethane
or $$C_2\text{–}C_4 \text{ paraffins}+\text{Oxygen} \rightarrow CO, CO_2 \text{ and } H_2O+\text{heat} \tag{5}$$

(c) Oxidation of hydrogen to water, which is also highly exothermic $$H_2+0.5O_2 \rightarrow H_2O+59.4 \text{ Kcal} \tag{6}$$

Hr=−59.4 Kcal.mol¹ of $H_2$

Endothermic reactions: Thermal cracking or non-oxidative pyrolysis of ethane or $C_2$–$C_4$ alkanes $$C_2H_6 \rightarrow C_2H_4+H_2-34.18 \text{ Kcal} \tag{7}$$

Hr=+34.18 Kcal.mol⁻ of ethane
or $$C_2\text{–}C_4 \text{ alkanes} \rightarrow C_2\text{–}C_4 \text{ oleffins}+\text{methane}+\text{hydrogen}-\text{heat} \tag{8}$$

Wherein, Hr=heat of reaction.

When the overall process is highly exothermic, particularly when the selectivity is not very high and also when the catalyst is highly active and when operated at very high space velocity or very low contact times, which resulted in a production of a large amount of heat in a small amount of catalyst, there are serious problems for the removal of heat from the reactor and also there is a possibility of reaction run-away condition if the rate of heat produced surpasses the rate of heat removal from the reactor. Hence, in order to avoid the possibility of reaction run-away condition and also to make the process operation very safe, it is very essential for the process to use catalyst having high selectivity and also to provide large enough heat transfer area required for the removal of heat by the conventional known methods from the reactor. The severity of the process due to the exothermic reactions can be greatly reduced by allowing the occurrence of the endothermic hydrocarbon cracking or pyrolyis to an appreciable extent simultaneously with the exothermic hydrocarbon oxidation reactions so that at least a part of the heat produced is used instantly by the endothermic reactions, thus not only reducing the process severity but also making the process most energy efficient. This can be achieved by providing a large contact time, in the vicinity of the catalyst, for the endothermic reactions, which are non-catalytic and hence are slower than the catalytic hydrocarbon oxidative conversion reactions, so that the endothermic reactions can occur to an appreciable extent. In a conventional catalytic fixed bed reactor, the contact time for the endothermic cracking or pyrolysis reactions is provided by the voids between the catalyst particles, which is very small and hence not enough for the endothermic reaction to occur to an appreciable extent. Hence, there is a need to develop a process wherein the contact time provided for the endothermic reactions relative to that provided for the catalytic exothermic reactions is large enough so that the endothermic reactions occur to an appreciable extent simultaneously with the exothermic reactions, thus making the process most energy efficient and also very safe.

The present energy crisis and/or high energy cost, high price of $C_2$–$C_4$ paraffins and also the environmental pollution problems have created a great need for developing a catalytic process for the oxidative conversion of ethane or $C_2$–$C_4$ alkanes to ethylene and higher olefins which requires little or no external energy, operates in a most energy efficient manner and with high conversion, selectivity and productivity and also has absolutely no hazards (i.e. very safe operation). This invention is, therefore, made with the above objects so that most of the drawbacks or limitations of the earlier processes could be overcome.

In the said process, the preferred reaction temperature is between about 700° C. and about 900° C.; the preferred pressure ranges from about 1 atm to about 5 atm; the preferred mole ratio of hydrocarbon to oxygen and steam in the feed ranges from about 3 to about 30 and about 0.3 to about 3, respectively; the preferred gas hourly space velocity of the feed ranges from about $1 \times 10^3$ cm³.g⁻¹ catalyst.h⁻¹ to about $3 \times 10^5$ cm³ g⁻¹ catalyst.h⁻¹; the preferred volume ratio of catalyst diluent to catalyst ranges from about 0.1 to about 150.

For the improved supported catalyst used in the said process, the preferred alkaline earth element A is Mg, Ca or a mixture thereof; the preferred rare earth element R is Ce, Nd, Sm, Eu, Gd, Yb or a mixture thereof; the preferred A/Sr mole ratio, a, ranges from about 0.01 to about 1.0; the preferred R/La mole ratio, c ranges from about 0.01 to about 1.0; the preferred loading of alkaline earth oxides, x, ranges from about 2.5 wt % to about 25 wt %,; the preferred loading of rare earth oxides, y, ranges from about 3 wt % to about 30 wt %; the support, S, is in the form of granules of size in the range of about 0.1 mm to about 8.0 mm or in the form of spherical or cylindrical pellets, extrudes, rings, saddles or star of diameter or size in the range of about 1.0 mm to about 15 mm and has surface area, pore volume and porosity in the range of about $0.001\ m^2.g^{-1}$ to about $5.0\ m^2.g^{-1}$, about $0.02\ cm^3.g^{-1}$ to about $0.6\ cm^3.g^{-1}$ and about 5% to about 75%, respectively.

Said catalyst without support, i.e. containing only mixed rare and alkaline earth oxides can also be employed in the process of this invention but the use of improved supported catalyst in this process is preferred.

The said process can be operated in a fixed bed reactor, such as a tubular reactor, a multitubular reactor or a radial flow reactor with an arrangement for removing heat from the reactor operated non-adiabatically. The process can also be operated adiabatically (i.e. without providing or removing heat from the reactor) when the net heat of reactions in the process is very small. The use of radial flow reactor is preferred particularly when the process is operated at very high space velocity to avoid high pressure drop across the catalyst bed.

In the said process, the products formed are ethylene, higher olefins (mainly propylene and butylenes with much smaller amounts of $C_5+$ olefins), methane, hydrogen, carbon monoxide, carbon dioxide and water. The gaseous product steam comprises of ethylene, propylene, butylenes, traces of $C_5+$ olefins, methane, $H_2$, CO, $CO_2$, $H_2O$ and unconverted ethane or $C_2-C_4$ paraffins and oxygen or air components.

The feed used in the said process comprises of ethane or $C_2-C_4$ praffins, oxygen or air enriched with oxygen, and steam. The hydrocarbon components of the feed and oxygen are reactants but steam is a feed diluent and acts as an indirect reactant for the gasification of the carbon formed in the process under oxygen deficient conditions or by thermal cracking or pyrolysis of hydrocarbons. The presence of steam in the feed has two beneficial effects: one, the formation of coke and tar-like product in the process are avoided and second, the severity of the exothermic hydrocarbon oxidation reactions is reduced due to the feed dilution. The steam in the product steam can be easily separated simply by its condensation. The preheating of the feed gases can be effected by exhanging heat between the hot reactor effluent product gas steam and the feed gases by the known conventional methods.

The role of catalyst dilution by the inert solid in the process of this invention is two fold; one, to provide a larger heat transfer area of the removal of heat from the reactor and thereby making easier the process control on the reaction temperature rise due to the heat produced in the exothermic oxidative hydrocarbon conversion reactions (Reactions 1–6) and second, to provide a large contact time, in a close vicinity of the catalyst, throughout the reactor for the endothermic thermal cracking or pyrolysis reactions (Reactions 7 and 8) as that both the exothermic and endothermic reactions can occur simultaneously in a close vicinity of each other and thereby the heat produced in the exothermic reactions is used instantly in the endothermic reactions, thus making the process most energy efficient and its operation very safe.

Since the thermal hydrocarbon cracking reactions have high activation energy, their reaction rate increases very fast with the increase in the temperature. The coupling of the exothermic and endothermic reactions, as described above, leads to an establishment of a sort of buffering action for the reaction temperature in the process thus restricting the temperature rise and, therefore, an occurrence of run-away reaction condition during the operation of the process is totally eliminated. Because of the coupling of the exothermic and endothermic reactions occurring simultaneously, the process of this invention can be made mildly exothermic, near thermoneutral or mildly endothermic by manipulating the process conditions. The process can be operated in a non-adiabatic fixed bed reactor without any serious problems for removing heat from the reactor, when the process is mildly exothermic or providing energy to the reactor, when the process is mildly endothermic, thus requiring no or little external energy, respectively. The process can also be operated adiabatically with no need to remove heat from the reactor or to provide heat to the reactor, particularly when the process is operated with near zero heat formation or when it is very mildly exothermic or endothermic. Because of the use of a simple adiabatic reactor for the process, several engineering problems concerning the reactor design, material of construction, process design and control are simplified and also the capital and operation cost of the process is much lower.

By the process of this invention, ethane or $C_2-C_4$ paraffins can be converted to ethylene with high conversion, selectivity and productivity and also in a most energy efficient and safe manner with requirement of little or no external energy.

The present invention is described with respect to the following examples illustrating the process of this invention for the simultaneous oxidative dehydrogenation and cracking of ethane, which is a representative of $C_2=C_4$ paraffins to ethylene using the improved supported catalyst in a most safe and energy efficient manner. These examples are provided for illustrative purposes only and are not to be construed as limitations on the invention.

In the oxidative conversion of methane or natural gas to ethylene, ethane and higher hydrocarbons at 800°–900° C., following exothermic and endothermic reactions occur simultaneously.

Exothermic Reactions
(a) Oxidative coupling of methane

$Hr=-20.68\ Kcal.mol^{-1}$ of $CH_4$ (b) Oxidative dehydrogenation of ethane and higher alkanes

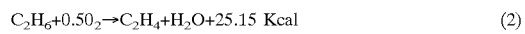

$Hr=-25.15\ Kcal.mol^-$ of $C_2H_6$

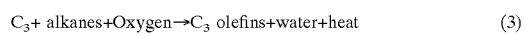

(c) Combustion of methane and higher hydrocarbons, which is a highly exothermic process

$Hr=-191.5\ Kcal.mol\_1$ of $CH_4$

$Hr=-124.1\ Kcal.\ mol^{-1}$ of $CH_4$

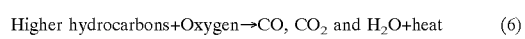

Endothermic reactions: Thermal cracking or non-oxidative pyrolysis of ethane and higher alkanes

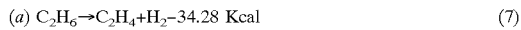
(a) $C_2H_6 \rightarrow C_2H_4 + H_2 - 34.28$ Kcal (7)

$H_r = +34.28$ Kcal.mol$^{-1}$ of ethane

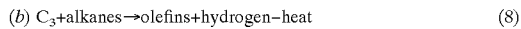
(b) $C_3+$alkanes$\rightarrow$olefins+hydrogen$-$heat (8)

Wherein, $H_r$=heat of reaction.

When the overall process is highly exothermic, particularly when the selectivity is below about 70% and also when the catalyst is highly active and hence operated at very high space velocity or very low contact times, which results in a production of a large amount of heat in a small amount of catalyst, there are serious problems for the removal of heat from the reactor and also there is a possibility of reaction run-away condition if the rate of heat produced surpasses the rate of heat removal from the reactor. Hence in order to avoid the possibility of reaction run-away condition and also to make the process operation very safe, it is very essential for the process to use catalyst having high selectivity and also to provide large enough heat transfer area required for the removal of heat by the conventional known methods from the reactor. The severity of the process due to the exothermic reactions can be greatly reduced by allowing the occurrence of the endothermic hydrocarbon cracking or pyrolysis to an appreciable extent simultaneously with the exothermic hydrocarbon oxidation reactions so that at least a part of the heat produced is used instantly by the endothermic reactions, thus not only reducing the process severity but also making the process most energy efficient. This can however be achieved only by providing a large contact time, in the vicinity of the catalyst, for the endothermic reactions, which are non-catalytic and hence are slower than the catalytic hydrocarbon can oxidative conversion reactions, so that the endothermic reactions can occur to an appreciable extent. In a conventional catalytic fixed bed reactor, the contact time for the endothermic cracking or pyrolysis reactions is provided by the voids between the catalyst particles which is very small and being not enough for the endothermic reaction to occur to an appreciable extent. Hence, there is a need to develop a process wherein the contact time provided for the endothermic reactions relative to that provided for the catalytic exothermic reactions is large enough so that the endothermic reactions occur to an appreciable extent simultaneously with the exothermic reactions, thus making the process most energy efficient and also very safe.

In the process disclosed by Brazdil Jr. et. al., (U.S. Pat. No. 4,822,944), the endothermic reactions occur in the voids between the packed catalyst particles and consequently occur with very low contact time and hence only to a very small extent or occur in two separate zones in the reactor-zone the catalyst-zone and second, the pyrolysis zone connected in series and therefore the catalytic exo-thermic and non-catalytic or homogeneous endothermic reactions do not occur simultaneously in close vicinity to each other but in a series and away from each other in the two separate zones, because of this the heat produced in the exothermic reaction is not used effectively for the endothermic reactions. Also, since the pyrolysis zone is separated from the catalyst zone, the operation of the process in the catalysts zone, where the exothermic reactions occur, is not safe because of the reasons given above.

The present energy crisis and/or high energy cost, high methane or natural gas price and also the environmental pollution problems have created a great need for developing a catalytic process for the oxidative conversion of methane or natural gas to ethylene, ethane and higher hydrocarbons, which requires little or no external energy, operates in a most energy efficient manner and with high selectivity and also have absolutely no hazards (i.e. very safe operation). This invention is, therefore, made with these objects so that the most of the drawbacks or limitations of the earlier processes could be overcomes.

Definition of Terms Used in the Examples

Total conversion of reactant (%)=mol % of the reactant converted to all products.

Conversion of a reactant to a particular product=mol % of the reactant converted to the particular product.

Selectivity for a particular product (%)=100×(Conversion of reactant to the product (%)/[Total conversion of reactant (%)]. Productivity for a particular product (mmol.g$^{-1}$.h$^{-1}$)= mmoles of the product formed in the process per gram of catalyst per hour. Gas hourly space velocity, GHSC=Volume of gaseous reactant mixture, measured at STP (i.e. at 0° C. and 1 atm), passed over a unit weight of catalyst per hour.

All the ratios of reactants or products are mole ratios. All the loading of catalyst components, expressed as percent loading are wt %.

$C_3+$hydrocarbons are the hydrocarbons containing three or more carbon atoms. $C_2+$hydrocarbons are the hydrocarbons containing two or more carbon atoms.

The net heat of reactions, $H_r$, in the overall process is defined as follows:

Net heat of reactions, $H_r = [H_f]$ products$-[H_f]$reactants, wherein, $[H_f]$products and $[H_f]$reactants are the heat of formation of products and reactants, respectively. The negative value of the net heat of reactions indicate that the overall process is exothermic and the positive value of the net heat of reactions indicate that the overall process is endothermic.

EXAMPLES 1 TO 12

In these examples, preparation of an improved supported catalyst with different R/La and A/Sr ratios, where R and A are rare earth and alkaline earth elements other than lanthanum and strontium, respectively, and with different loadings of alkaline earth metal oxides on precoated support and rare earth oxides on different supports, by the process of this invention is illustrated.

The catalyst is prepared in two steps by the following general procedure.

Step 1: Precoating of Support with Rare Earth Oxides

Precursor of lanthanum and other rare earth oxides e.g. compounds of lanthanum and other rare earth elements, which on decomposition are converted into oxide from, with desired R/La mole ratio, are deposited on catalyst support either by impregnating it with water soluble precursor compounds from their mixed aqueous solution or by coating the support with insoluble precursor compounds from their fine slurry. The impregnation of soluble precursor compounds on the support is done by the incipient wetness impregnation method (IWIM) in which a concentrated solution of the precursor compound just enough in volume to fill all the pores of the support is added to the support or by the wet impregnation method (WIM) in which a concentrated solution of the precursor compounds in excess of volume required for filling all the pores of the support is added to the support and the excess of solution is removed. The coating of insoluble precursor compounds is done by making a slurry of the finely ground compounds in water and mixing it with the support. After the impregnation or the coating, the wet support is dried in air or under vacuum first slowly at 60° C. for 5 h and then at 110° C. for 2 h. The dried mass is then decomposed by heating it in air, or in $N_2$ or under vacuum at a temperature in the range of 400° C. to 700° C. for a period in the range of 0.5 h to 15 h. The decomposed mass is then finally calcined in air or in $N_2$ or under vacuum at a temperature in the range of 800° C. to 1000° C. for a period in the range of 1 h to 20 h. In case the observed loading of the rare earth oxides on the support is found to be less than the desired one, the above procedure is repeated so that the desired loading can be obtained.

Step 2: Deposition of Alkaline Earth Metal Oxides on the Precoated Support

Precursor compounds of strontium and other alkaline earth elements with A/Sr mole ratio are deposited on the precoated support, obtained in the first step, by impregnating the precoated support with water soluble precursor compounds from their mixed aqueous solution or by coating the precoated support with water insoluble precursor compounds from their mixed fine slurry, by the methods similar to that described in Step 1. After the impregnation or the coating, the wet supported catalyst mass is dried, decomposed and then calcined by the procedures similar to that described in Step 1, to get the improved catalyst of this invention.

The details of the preparation of improved supported catalyst in Examples 1 to 12, not covered in the above procedure, such as the precursor compounds of lanthanum and other rare earth elements and strontium and other alkaline earth elements, method of deposition (e.g.) impregnation or coating) and preparation conditions, are given in Tables 1–3. The properties of support used in the preparation of improved supported catalyst in Examples 1 to 12 are given in Table 4.

EXAMPLE 13

This example illustrates that the improved supported catalyst of this invention, prepared in Examples 1 to 12 by varying the catalyst preparation process parameters, shows high conversion with very high selectivity and productivity in the oxidative coupling of methane to higher hydrocarbons ($C_{2+}$—hydrocarbons) in the presence of free oxygen at low temperature, below 900° C. and at very high space velocity.

The catalytic reaction over the catalyst is carried out in a continuous flow tubular fixed bed quartz reactor packed with the catalyst by passing over it a feed comprising of reactants at different reaction conditions. The reactor was kept in an electrically heated tubular furnace. The reaction temperature was measured by Cromel-Alumel thermocouple located in the catalyst bed. The reactor effluent gases were cooled at about 0° C. to condense the water from them, using a coiled condenser immersed in ice-water slurry, and then analysed for the products and unconverted reactants by an on-line gas chromatograph.

The performance of the catalysts prepared in Examples 1–12 for the oxidative coupling of methane to higher hydrocarbons is evaluated at the following reaction conditions:

| Feed | A mixture of pure methane and oxygen. |
|---|---|
| $CH_4/O_2$ mole ratio in feed | 8.0 and 16.0 |
| Gas hourly space velocity(GHSV) | 1,03,200 cm$^3$ .g$^{-1}$.h$^{-1}$ |
| pressure | 1.2 atm. |
| Reaction temperature | 850°C. + 5°C. |

The results obtained at the two different $CH_4O_2$ mole ratios in feed are presented in Tables 5 and 6.

EXAMPLE—14

This example illustrates that the improved supported catalyst of this invention, preparation of which is described in Example—1, shows no sign of deactivation when used for oxidative coupling of methane to higher hydrocarbons. The time-on-stream activity and selectivity of the catalyst in the catalytic reaction is measured in the catalytic reactor and by the procedure described in Example—13, at the following reaction conditions:

| Feed composition | 80.0 mol % $CH_4$, 4.0 mol % $O_2$ and 16.0 mol % steam. |
|---|---|
| Gas hourly space velocity (GHSV) | 1,03,200 cm$^3$ . g PT-PT PT1PT |
| Pressure | 1.2 atom. |
| Reaction temperature | 850° + 5°C. |

The results are presented in table 7.

EXAMPLE—15

This example illustrates that the improved supported catalyst of this invention shows high activity and selectivity in the oxidative conversion of natural gas to ethylene and other lower olefins. The oxidative conversion of natural gas over the improved supported catalyst C 6 prepared in Example—6 is carried out in the reactor and by the procedure described in Examples—13, at the following process conditions:

| Feed | A mixture of natural gas, oxygen and steam |
|---|---|
| Natural gas/$O_2$ mole ratio in feed | Varied from 11.5 to 19 |
| $H_2O$/natural gas mole ratio in feed | 0 or 1.0 |
| Gas hourly space velocity (GHSV) | 1,30,800–2, 52,800 cm$^3$g$^{-1}$h$^-$ |
| Pressure | 1.1 atm. |
| Reaction temperature | 845°–860°C. |

The results obtained at different process conditions are presented in Table—8. The composition of natural gas is as follows:

Natural gas composition (mol %):

$CH_4$:88.9%, $C_2H_6$:6.3%, $C_3H_8$:2.3%
$C_4H_{10}$:0.9%, $CO_2$:1.1%, $N_2$:0.5%

EXAMPLE—16

This example illustrates that the improved supported catalyst of this invention also shows very high activity, selectivity and productivity or efficiency in the oxidative dehydrogenation of ethane, which is a representative of lower alkanes (i.e. $C_2$–$C_4$ alkanes). The oxidative dehydrogenation of ethane to ethylene over the improved supported catalyst C 1 prepared in Example-1 is carried out in the reactor and by the procedure described in Example-13, at the following reaction conditions:

| Feed | A mixture or ethane, oxygen and steam |
|---|---|
| $C_2H_6/O_2$ mole ratio in feed | 3.0–8.0 |
| $C_2H_6/H_2O$ mole ration in feed | 0.6–1.3 |
| Gas hourly space velocity (GHSV) | 18,900–1,97,400 cm$^3$.g$^{-1}$.h$^{-1}$ |
| Pressure | 1.2 atm. |
| Reaction | 750°–860°C. |

The results obtained at difference process conditions are presented in Table-9.

EXAMPLES 17 to 19

In these examples, a process for the preparation of the improved supported catalyst with different R/La and A/Sr ratios, where R and A are rare earth and alkaline earth elements other than lanthanum and strontium, respectively and with different loadings of rare earth oxides on a commercial support and of alkaline earth metal oxides on the precoated supports is disclosed.

The catalyst is prepared in two steps by the following general procedure.

Step 1: Precoating of support with rare earth oxides

Precursor of lanthanum and other rare earth oxides e.g. compounds of lanthanum and other rare earth elements, which on decomposition are converted into oxide form, with desired R/La mole ratio, are deposited on a low surface area sintered porous catalyst carrier SA 5205, obtained from Norton Co., U.S.A., by impregnating it with water soluble procursor compounds from their mixed aqueous solution. The impregnation of soluble precursor compounds on the support is done by the incipient wetness impregnation method (IWIM) in which a concentrated solution of the precursor compound just enough in volume to fill all the poress of the support is added to the support. After the impregnation, the wet support is dried in air first slowly at 60° C. for 5 h and then at 110° C. for 2 h. The dried mass is then decomposed by heating it in air at a temperature in the range of 450° C. to 600° C. for a period in the range of 2 h to 6 h. The decomposed mass is then finally calcined in air at a temperature in the range of 850° C. to 950° C. for a period in the range of 3 h to 10 h.

Step 2: Deposition of alkaline earth metal oxides on the precoated support.

Precursor compounds of strontium and other alkaline earth elements with desired A/Sr mole ratio are deposited on the precoated support, obtained in the first step, by impregnating the precoated support with water soluble precursor compounds from their mixed aqueous solution by the method similar to that described in Step 1. After the impregnation, the wet supported catalyst mass is dried, decomposed and then calcined by the procedures similar to that described in Step 1, to get the improved catalyst.

The details of the preparation of improved supported catalyst in Examples 17 to 19, not covered in the above procedure, such as the precursor compounds of lanthanum and other rare earth elements and strontium and other alkaline earth elements. A/Sr and R/La mole ratios and preparation conditions, are given in Table 10. The support SA-5205 comprises of 86.1% $Al_2O_3$, 11.8% $SiO_2$, 0.6% $K_2O$, 0.6% $K_2O$, 0.4% CaO, 0.4% MgO, 0.4% $Na_2O$, 0.2% $Fe_2O_3$, and <0.05% $ZrO_2+HfO_2$ and has surface area of <0.05 $m_3 \cdot g^{-1}$, pore volume of 0.35 $cm^3 \cdot g^{-1}$ and porosity of 54%.

EXAMPLE-20

This example illustrates the process of this invention for the simultaneous oxidative dehydrogenation and cracking of ethane, which is a representative of $C_2–C_4$ paraffins, to ethylene and higher olefins (propylene and butylenes) in the presence of free oxygen and steam at different process conditions, using the improved supported catalysts prepared in Examples 17 to 19 with the dilution of the catalyst by different inert refractory solids with different catalyst diluent/catalyst ratios.

The process using the catalyst diluted with an inert refractory solid is carried out in a continuous flow tubular fixed bed quartz reactor packed with the catalyst distributed uniformly in the inert refractory solid (e.g. quartz or SA 5205) particles or pellets having nearly the same size and shape as that of the catalyst, by passing over the diluted catalyst a feed comprising of ethane, oxygen and steam at different reaction conditions. The reactor was kept in an electrically heated tubular furnace. The reaction temperature was measured by Chromel-Alumel thermocouple located in the diluted catalyst bed. The reactor effluent gases were cooled at about 0° C. to condense the water from them, using a coiled condenser immersed in ice-water slurry, and then analyzed for the products and unconverted reactants by an on-line gas chromatograph.

The process performance for the simultaneous oxidative dehydrogenation and cracking of ethane to ethylene and over the catalysts, prepared in Examples 17 to 19 diluted to different extents, is evaluated at the following process conditions:

| | |
|---|---|
| Catalyst diluent | Quartz particles or SA 5205 having same size of particles or pellets as that of the catalyst used |
| Catalyst diluent/catalyst ratio (V/V) | varied from 0.1 to 130 |
| Feed | A mixture of pure ethane, oxygen and steam |
| $C_2H_6/O_2$ mole ratio in feed | varied from 4.5 to 20 |
| $C_2H_6/H_2O$ mole ratio in feed | varied from 0.3 to 3.0 |
| Gas hourly space velocity (GHSV) | varied from 690 to 2,08,700 $cm^3 \cdot G^{-1}$ catalyst.$h^{-1}$ |
| Pressure | 1.2 atm. |
| Reaction temperature | 800° or 850°C. |

The results obtained for the catalysts prepared in Examples 17 to 19 at the different process conditions are presented in Table 11a and 11b.

The net heat of reactions in the process is quite small with positive or negative sign, indicating that the process at the corresponding reaction conditions is mildly endothermic or mildy exothermic, respectively. This example illustrates that the process of this invention occurs in a most energy efficient and safe manner and also the process can be made mildly exothermic, near thermoneutral or mildly endothermic by manipulating the process conditions.

EXAMPLES 21 to 25

In these examples, a process for the preparation of the improved supported catalyst with different R/La and A/Sr ratios, where R and A are rare earth and alkaline earth elements other than lanthanum and strontium, respectively and with different loadings of rare earth oxides on commercial support and of alkaline earth metal oxides on the precoated supports is disclosed.

The catalyst is prepared in two steps by the following general procedure.

Step 1: Precoating of support with rare earth oxides

Precursor of lanthanum and other rare earth oxides e.g. compounds of lanthanum and other rare earth elements, which on decomposition are converted into oxide form, with desired R/La mole ratio, are deposited on a low surface are sintered porous catalyst carrier SA 5205, obtained from Norton Co. USA, by impregnating it with water soluble precursor compounds from their mixed aqueous solution. The impregnation of soluble precursor compounds on the support is done by the incipient wetness impregnation method (IWIM) in which a concentrated solution or the precursor compound just enough in volume to fill all the pores of the support is added to the support. After the impregnation, the wet support is dried in air first slowly at 60° C. for 5 h and then at 110° C. for 2 h. The dried mass is then decomposed by heating it in air at a temperature in the range of 450° C. to 600° C. for a period in the rane of 2 h to 7 h. The decomposed mass is then finally calcined in air at a temperature in the range of 850° C. to 950° C. for a period in the range of 3 h to 10 h.

Step 2: Deposition of alkaline earth metal oxides on the precoated support

Precursor compounds of strontium and other alkaline earth elements with desired A/Sr mole ratio are deposited on the precoated support, obtained in the first step, by impregnating the precoated support with water soluble precursor compounds from their mixed aqueous solution by the method similar to that described in Step 1. After the impregnation, the wet supported catalyst mass is dried, decomposed and then calcined by the procedures similar to that described in Step 1, to get the improved catalyst.

The details of the preparation of improved supported catalyst in Examples 21 to 25, not covered in the above procedure such as the precursor compounds of lanthanum and other rare earth elements and strontium and other alkaline earth elements, A/Sr and R/La mole ratio and preparation conditions, are given in Tables 12. The support SA-5205 comprises of 86.1% $Al_2O_3$, 11.8% $SiO_2$, 0.6% $K_2O$, 0.4% CaO, 0.4% MgO, 0.4% $Na_2O_3$, and <0.05% $ZrO_2$+$HfO_2$ and has surface area of <0.05 $m^3 \cdot g^{-1}$, pore volume of 0.35 $cm^3 \cdot g^{-1}$ and porosity of 54%

EXAMPLE-26

This example illustrates the process of this invention for the oxidative conversion of methane to ethylene, ethane and higher hydrocarbons ($C_3$+hydrocarbons) in the presence of free oxygen at a temperature below 900° C. and at very high space velocity using the improved supported catalyst prepared in Examples 21 to 25 with the catalyst dilution by different inert refractory solids.

The catalytic reaction over the catalyst diluted with an inert refractory solid is carried out in a continuous flow tubular fixed bed quartz reactor packed with the catalyst distributed uniformly in the inert refractory solid (e.g. quartz or SA 5205) particles or pellets having nearly the same size and shape as that of the catalyst, by passing over the diluted catalyst a feed comprising of reactants at different reaction conditions. The reactor was kept in an electrically heated tubular furnace. The reaction temperature was measured by Chromel-Alumel-thermocouple located in the diluted catalyst bed. The reactor effluent gases were cooled at about 0° C. to condense the water from them, using a coiled condenser immersed in ice-water slurry, and the analyzed for the products and unconverted reactants by an on-line gas chromatograph.

The process performance for the oxidative conversion of methane to ethylene, ethane and higher hydrocarbons over the catalysts prepared in Examples 21 to 25 is evaluated at the following process conditions:

| | |
|---|---|
| Catalyst diluent | Quartz particles or SA 5205 having Some size of particles or pellets as that of the catalyst used |
| Catalyst diluent/catalyst ratio (v/v) | 1.0 |
| Feed | A mixture of pure methane, oxygen and steam |
| $CH_4/O_2$ mole ratio in feed | varied from 4.0 to 24 |
| $H_2O/CH_4$ mole ratio in feed | varied from 0.01 to 1.0 |
| Gas hourly space velocity (GHSV) | varied from 66,500 to 2,32,760 $cm^3 \cdot g^{-1}$ $catalyst.h^{-1}$ |
| Pressure | 1.2 atm |
| Reaction temperature | varied from 855°C. to 890°C. |

The results obtained at the different process conditions are presented in Table 13.

EXAMPLE-27

This example illustrates the process of this invention for the oxidative conversion of methane to ethane, and higher hydrocarbons $C_3$+hydrocarbons), using the improved supported catalyst C-3 and C-5, prepared in Examples-23 and 25, respectively, with catalyst diluent to catalyst ratio (v/v) of 27.0 at the different process conditions.

The process was carried out in the reactor and by the procedure similar to that described in Example-26, at the following process conditions:

| | |
|---|---|
| Catalyst diluent | SA 5205 having particle size same as that of the supported catalyst |
| Catalyst diluent/catalyst ratio (v/v) | 27.0 |
| Feed | A mixture of pure methane, oxygen and steam |
| $CH_4/O_2$ mole ratio in feed | 15.4 or 21.5 |
| $H_2O/CH_4$ mole ratio in feed | 0.3 or 1.1 |
| Gas hourly space velocity (GHSV) | 1,16,500 or 1,20,100 $cm^3 \cdot g^{-1}$ $catalyst.h^{-1}$ |
| Pressure | 1.2 atm. |
| Reaction | varied from 850° to 890°C. |

The results obtained for the two catalysts at the different process conditions are presented in Table 14.

EXAMPLE-28

This example illustrates the process of this invention for the oxidative conversion of natural gas to ethylene and higher hydrocarbons using the improved supported catalyst diluted with the support SA 5205 used in the supported catalyst. The oxidative conversion of natural gas over the improved supported catalyst, C-5, prepared in Example-25 and diluted with SA 5205 is carried out in the reactor and by the procedure similar to that described in Examples-6, at the following process conditions:

| | |
|---|---|
| Catalyst diluent | 1 mm size particles of SA 5205 |
| Catalyst diluent/catalyst | 1.0 or 57.0 |
| Feed | A mixture of natural gas, oxygen and steam |
| Natural gas/$O_2$ mole ratio in feed | varied from 10 to 20 |
| $H_2O$/Natural gas mole ratio in feed | 0.4 or 1.0 |
| Gas hourly space velocity (GHSV) | varied from 1,02,710 to 3,59,450 $cm^3 \cdot g^{-1}$ $catalyst.h^{-1}$ |
| Pressure | 1.5 atm. |
| Reaction temperature | varied from 850° to 890°C. |

The results obtained at different process conditions are presented in Table-15. The composition of natural gas is as follows:

Natural gas composition (mol %)

$CH_4$:88.9%, $C_2H_6$:6.3%, $C_3H_8$:2.3% $C_4H_{10}$:0.9%, $CO_2$:1.1%, $CO_2$:0.5%

The net heat of reaction in the exothermic process is quite small and can be controlled by controlling the process conditions, particularly natural gas/$O_2$ ratio in the feed. Main advantage and/or major improvements achieved by this invention over the earlier inventions are as follows:

(I) The improved supported catalyst of this invention contains only very high melting components, melting much above 1500° C. and hence the catalyst is thermally very stable during its operation for a very long period and also does not deactivate due loss of any active catalyst component during its operation in the high temperature processes.

(II) Because of the use of sintered low surface area porous inert support made-up refractory material in the catalyst preparation, the chemical interactions of the catalyst components with the support are eliminated or greatly reduced and also supported catalysts has very high thermal stability, mechanical strength and attrition resistance.

(III) The incorporation of the other alkaline earth and rare earth elements along with strontium and lanthanum, respectively, in the catalyst results in a synergetic effect causing an enhancement in the activity, selectivity and productivity of the catalyst due to the presence of strontium and other alkaline earth metal oxides together and also due to the presence of lanthanum and other rare earth oxides together in the catalyst. Further there exists a layer of rare earth oxides between the support and the alkaline earth metal oxides and thereby direct contact and consequently chemical interactions between the support and the alkaline earth metal oxides are avoided or greatly reduced. Because of these reasons, the improved supported catalyst prepared by the process of this invention, shows very high activity, selectivity and productivity without catalyst deactivation in the oxidative coupling of methane to higher hydrocarbons, in the oxidative conversion of natural gas to ethylene and other lower olefins and also in the oxidative dehydrogenation of lower alkanes to the corresponding olefins, in the presence of free oxygen. Further, the improved supported catalyst shows not only higher activity, selectivity and productivity in the above processes but also operates at lower temperatures, below 900° C.

(I) The improved supported catalyst contains only very high melting components, melting much about 1500° C., and hence the catalyst is thermally or hydrothermally very stable during its operation for a very long period and also does not deactivate due to loss of any active catalyst component during its operation in the high temperature processes.

(II) Because of the use of sintered low surface area porous inert support made-up refractory material in the catalyst preparation, the chemical interactions of the catalyst components with the support are eliminated or greatly reduced and also supported catalysts has very high thermal stability, mechanical strength and attrition resistance.

(III) The incorporation of the other alkaline earth and rare earth elements along with strontium and lanthanum, respectively, in the catalyst results in a synergetic effect causing an enhancement in the activity, selectivity and productivity of the catalyst due to the presence of strontium and other alkaline earth metal oxides together and also due to the presence of lanthanum and other rare earth oxides together in the catalyst. Further there exists a layer of rare earth oxides between the support and the alkaline earth metal oxides and thereby direct contact and consequently chemical interactions between the support and the alkaline earth metal oxides are avoided or greatly reduced. Because of these reasons, the improved supported catalyst shows very high activity, selectivity and productivity without catalyst deactivation in the oxidative dehydrogenation of ethane or $C_2$–$C_4$ paraffins in the presence of free oxygen.

(IV) In the process of this invention, the catalyst is diluted with an inert refractory solid by uniformly distributing the catalyst particles or pellets in the bed of the catalyst diluent. Because of the catalyst dilution, more surface for the heat transfer is available for removing the exothermic heat of the process, thus eliminating the serious problems associated with the removal of heat from the reactor and also avoiding the formation of hot spot in the catalyst bed and consequently eliminating the risk of reaction run-away conditions. Further the catalyst dilution also provides more contact time for the homogeneous or non-catalytic endothermic hydrocarbon cracking reactions occurring simultaneously with the catalytic exothermic oxidative hydrocarbon conversion reactions in the vicinity of the catalyst.

(V) Further, in the process of this invention, the feed is diluted with steam. Because of the feed dilution the severity of the exothermic reactions in the process is reduced. Also, because of the presence of steam in the feed, there is no coke deposition on the catalyst or reactor walls even under the oxygen deficient conditions and also there is no formation of tar-like product in the process.

(VI) In the process of this invention, because of the simultaneous occurrence of the endothermic hydrocarbon cracking reactions to an appreciable extent and the exothermic oxidative hydrocarbon conversion reactions in a close vicinity of each other, the heat produced in the exothermic reactions is used instantly in the endothermic reactions. The coupling of the exothermic reactions with the endothermic ones has imparted following outstanding features to the process of the present invention over the earlier processes:

(i) The process is operated in a most energy efficient manner.

(ii) The process is operated in a very safe manner without formation of hot spots in the reactor and with no possibility of reaction run-away conditions.

(iii) The process can be made mildly exothermic, near thermo-neutral or mildly endothermic by manipulating the process conditions.

(iv) The process can be operated in a non-adiabatic fixed bed reactor without any serious problems for removing heat from the reactor, when the process is mildly exothermic or providing energy to the reactor, when the process is mildly endothermic, thus requiring no or little external energy, respectively.

(v) The process can also be operated adiabatically with no need to remove heat from the reactor or to provide heat to the reactor, particularly when the process is operated with near zero heat formation or when it is very mildly exothermic. Because of the use of a simple adiabatic reactor for the process, several engineering problems concerning the reactor design, material of construction, process design and control are simplified and also the capital and operation cost of the process is much lower.

In the process of this invention, the improved supported catalyst, containing mixed strontium and other alkaline earth oxides deposited on a sintered low surface area porous catalyst support precoated with mixed lanthanum and other rare earth oxides, is employed for the oxidative conversion of methane or natural gas to ethylene, ethane and higher hydrocarbons. The main advantage of the improved catalyst over the earlier catalysts used for this process are as follows:

(I) The improved supported catalyst contains only very high melting components, melting much above 1500° C. and hence the catalyst is thermally very stable during its operation for a very long period and also does not deactivate due to loss of any active catalyst component during its operation in the high temperature processes.

(II) Because of the use of sintered low surface area porous inert support made-up refractory material in the catalyst preparation, the chemical interactions of the catalyst components with the support are eliminated or greatly reduced and also supported catalysts has very high thermal stability, mechanical strength and attrition resistance.

(III) The incorporation of the other alkaline earth and rare earth elements along with strontium and lanthanum, respectively, in the catalyst results in a synergetic effect causing an enhancement in the activity, selectivity and productivity of the catalyst due to the presence of strontium and other alkaline earth metal oxides together and also due to the presence of lanthanum and other rare earth oxides together in the catalyst. Further, there exists a layer of rare earth oxides between the support and the alkaline earth metal oxides and thereby direct contact and consequently chemical interactions between the support and the alkaline earth metal oxides are avoided or greatly reduced. Because of these reasons, the improved supported catalyst shows very high activity, selectivity and productivity without catalyst deactivation in the oxidative conversion of methane or natural gas to ethylene, ethane and higher hydrocarbons in the presence of free oxygen. Further, the improved supported catalyst shows not only higher activity, selectivity and productivity in the above process but also operates at lower temperatures (below 900° C.). Furthermore, the catalyst also shows high activity, selectivity and productivity in oxidative dehydrogenation of ethane to ethylene at the operating conditions of the above process.

(IV) In the process of this invention, the catalyst is diluted with an inert refractory solid by uniformly distributing the catalyst particles or pellets in the bed of the catalyst diluent. Because of the catalyst dilution, more surface for the heat transfer is available for removing the exothermic heat of the process, thus eliminating the serious problems associated with the removal of heat from the reactor and also avoiding the formation of hot spot in the catalyst bed and consequently eliminating the risk of reaction run-away conditions. Further the catalyst dilution also provides more contact time for the homogeneous or non-catalytic reactions occurring simultaneously with the catalytic reactions, in the vicinity of the catalyst.

(V) The process of this invention is highly energy efficient because of the simultaneous occurrence of the endothermic reactions, hydrocarbon cracking to an appreciable extent due to the provision of higher contact time in the vicinity of the catalyst due to its dilution with an inert solid, with the exothermic oxidative hydrocarbon conversion reactions; the heat produced in the exothermic reactions is used-up, at least partly, in the endothermic reactions. Because of this the net heat produced is small enough to be removed from the reactor easily without any serious problems and hence there is no risk of reaction run-away conditions, thus making the process operation much more safer and also most energy efficient.

(IV) Furthermore, in the process of this invention, the feed is diluted with steam. Because of the feed dilution the severity of the exothermic reactions in the process is reduced. Also, because of the presence of steam in the feed, there is no coke deposition on the catalyst or reactor walls even under the oxygen deficient conditions and also there is no formation of tar-like product in the process.

(VII) Finally, the process of this invention is much safer because of the above and also because of the lower concentration of oxygen, relative to that of methane or natural gas, used in the feed, which is far away from the explosion limit.

Details of the production of catalysts described in Examples 1–12 are shown in the following Tables 1–3. Table 4 gives details of the properties of certain catalysts. Tables 5–9 give details of the use of certain catalysts. Table 10 gives details of the preparations of the catalysts of Examples 17–19 and Tables 11a and 11b refer to the use of such catalysts. Table 12 gives details of the preparation of the catalysts of Examples 21–25 and Tables 13–15 give details of the use of some of these catalysts.

TABLE 1

Details of the preparation of improved supported catalyst in Examples 1–4

|  | Example 1 | Example 2 | Example 3 | Example 4 |
|---|---|---|---|---|
| Support used | SA 5205 | SA 5205 | SA 5205 | SA 5205 |
| Shape and size of support | 6aa spheres | 6aa spheres | 6aa spheres | 6aa spheres |
| Precoating of the support with rare earth oxides |  |  |  |  |
| Precursor compound of La | La - nitrate | La - nitrate | La - nitrate | La - nitrate |
| Precursor compound of R | Nd - nitrate | Gd - nitrate | Sa - nitrate | Nd - nitrate |
| R/La mole ratio | 1.0 | 1.0 | 1.0 | 1.0 |
| Method of deposition | IWIM | IWIM | IWIM | IWIM |
| Decomposition temp. (° C.) | 580° C. | 550° C. | 500° C. | 500° C. |
| Decomposition atmosphere | Air | Air | Air | Air |
| Decomposition period (h) | 4 h | 3 h | 4 h | 4 h |
| Calcination temp. (° C.) | 950° C. | 900° C. | 950° C. | 900° C. |
| Calcination atmosphere | Air | Air | Air | Air |
| Calcination period (h) | 4 h | 6 h | 4 h | 4 h |
| Loading of rare earth oxides, y (wt %) | 16.9% | 15.9% | 16.1% | 10.9% |
| Deposition of alkaline earth metal oxides on precoated support |  |  |  |  |
| Precursor compound of Sr | Sr - nitrate | Sr - nitrate | Sr - nitrate | Sr - nitrate |
| Precursor compound of A | Mg - nitrate | Ca - nitrate | Ca - nitrate | Mg - nitrate |

TABLE 1-continued

Details of the preparation of improved supported catalyst in Examples 1–4

|  | Example 1 | Example 2 | Example 3 | Example 4 |
|---|---|---|---|---|
| A/Sr mole ratio | 1.0 | 0.1 | 1.0 | 1.0 |
| Method of deposition | IWIM | IWIM | IWIM | IWIM |
| Decomposition temp. (° C.) | 450° C. | 490° C. | 490° C. | 500° C. |
| Decomposition atmosphere | Air | Air | Air | Air |
| Decomposition period (h) | 4 h | 4 h | 4 h | 3 h |
| Calcination temp. (° C.) | 900° C. | 900° C. | 850° C. | 900° C. |
| Calcination atmosphere | Air | Air | Air | Air |
| Calcination period (h) | 4 h | 4 h | 6 h | 4 h |
| Loading of alkaline earth oxides, x (wt %) | 10.0% | 11.4% | 11.1% | 18.1% |
| Improved supported catalyst produced | C 1 | C 2 | C 3 | C 4 |

IWIM = incipient wetness impregnation method
C 1 = $MgSrO_2(10\%)/NdLaO_3(16.9\%)$/SA 5205;
C 2 = $Ca_{0.1}SrO_{1.1}(11.4\%)/GdLaO_3(15.9\%)$/SA 5205;
C 3 = $CaSrO_2(11.1\%)/SmLaO_3(16.1\%)$/SA 5205;
C 4 = $MgSrO_2(10.1\%)/NdLaO_3(10.9\%)$/SA 5205;

TABLE 2

Details of the preparation of improved supported catalyst in Examples 5–8

|  | Example 5 | Example 6 | Example 7 | Example 8 |
|---|---|---|---|---|
| Support used | SA 5205 | SA 5218 | SA 5218 | SA 5232 |
| Shape and size of support | 3aa granules | 7aa granules | 4.5aa spheres | 4.5aa spheres |
| Precoating of the support with rare earth oxides | | | | |
| Precursor compound of La | Li - nitrite | Li - nitrite | Li - nitrate | Li - nitrate |
| Precursor compound of R | Ce - nitrate | Nd - nitrate | Nd - nitrate | Eu - nitrate |
| R/La mole ratio | 1.0 | 0.6 | 0.2 | 0.81 |
| Method of deposition | IWIM | IWIM | IWIM | IWIM |
| Decomposition temp. (° C.) | 510° C. | 500° C. | 480° C. | 480° C. |
| Decomposition atmosphere | Air | Air | Air | Air |
| Decomposition period (h) | 4 h | 4 h | 6 h | 28 h |
| Calcination temp. (° C.) | 900° C. | 930° C. | 950° C. | 880° C. |
| Calcination atmosphere | Air | Air | Air | Air |
| Calcination period (h) | 6 h | 4 h | 3 h | 10 h |
| Loading of rare earth oxides, y (wt %) | 17.8% | 16.1% | 17.5% | 20.3% |
| Deposition of alkaline earth metal oxides on precoated support | | | | |
| Precursor compound of Sr | Sr - nitrate | Sr - nitrate | Sr - nitrate | Sr - nitrate |
| Precursor compound of A | Mg - nitrate | Mg - nitrate | Ca - nitrate | Ba - nitrate |
| A/Sr mole ratio | 0.2 | 1.0 | 0.2 | 0.2 |
| Method of deposition | IWIM | IWIM | IWIM | IWIM |
| Decomposition temp. (° C.) | 450° C. | 500° C. | 500° C. | 500° C. |
| Decomposition atmosphere | Air | Air | Air | Air |
| Decomposition period (h) | 6 h | 4 h | 4 h | 5 h |
| Calcination temp. (° C.) | 950° C. | 1000° C. | 980° C. | 850° C. |
| Calcination atmosphere | Air | Air | Air | Air |
| Calcination period (h) | 3 h | 2 h | 4 h | 5 h |
| Loading of rare earth oxides, x (wt %) | 12.8% | 9.0% | 4.1% | 17.7% |
| Improved supported catalyst produced | C 5 | C 6 | C 7 | C 8 |

IWIM = incipient wetness impregnation method
C 5 = $MgSrO_2(12.8\%)/CeLaO_{3.5}(17.8\%)$/SA 5205;
C 6 = $MgSrO_2(9.0\%)/Nd_{0.6}LaO_{2.4}(16.1\%)$/SA 5218;
C 7 = $Ca_{0.2}SrO_{1.2}(4.1\%)/Nd_{0.2}LaO_{1.8}(17.5\%)$/SA 5218;
C 8 = $Ba_{0.2}SrO_{1.2}(17.7\%)/Eu_{0.04}LaO_{1.56}(20.3\%)$/SA 5205;

TABLE 3

Details of the preparation of improved supported catalyst in Examples 9–12

|  | Example 9 | Example 10 | Example 11 | Example 12 |
|---|---|---|---|---|
| Support used | SS 5231 | SA 5552 | SA 5205 | SA 5205 |
| Shape and size of support | 4.5aa spheres | Rings of 8aa OD, 4aa ID, and 7aa length | 6aa spheres | 6aa spheres |
| Precoating of the support with rare earth oxides | | | | |
| Precursor compound of La | La - nitrate | La - nitrate | La - acetate | $La_2O_3$ |
| Precursor compound of R | Nd - nitrate | Yb - nitrate | Ce - nitrate | Sa - carbonate |
| R/La mole ratio | 0.1 | 0.2 | 0.02 | 0.1 |
| Method of deposition | WIM | WIM | WIM | Coating |
| Decomposition temp. (° C.) | 550° C. | 500° C. | 500° C. | 700° C. |
| Decomposition atmosphere | $N_2$ | Air | Air | vacuum (1 torr) |
| Decomposition period (h) | 4 h | 6 h | 15 h | 0.5 h |
| Calcination temp. (° C.) | 900° C. | 900° C. | 900° C. | 950° C. |
| Calcination atmosphere | Air | Air | Air | $N_2$ |
| Calcination period (h) | 5 h | 4 h | 4 h | 1 h |
| Loading of rare earth oxides, y (wt %) | 21.1% | 22.4% | 19.9% | 27.5% |
| Deposition of alkaline earth metal oxides on precoated support | | | | |
| Precursor compound of Sr | Sr - nitrate | Sr - nitrate | Sr - acetate | Sr - hydroxide |
| Precursor compound of A | Ca - nitrate | Ba - nitrate | Mg - acetate | Ca - hydroxide |
| A/Sr mole ratio | 0.2 | 0.01 | 0.1 | 0.1 |
| Method of deposition | WIM | WIM | WIM | Coating |
| Decomposition temp. (° C.) | 550° C. | 500° C. | 500° C. | 550° C. |
| Decomposition atmosphere | $N_2$ | Air | Air | vacuum (1 torr) |
| Decomposition period (h) | 4 h | 4 h | 15 h | 6 h |
| Calcination temp. (° C.) | 900° C. | 925° C. | 900° C. | 900° C. |
| Calcination atmosphere | Air | Air | Air | $N_2$ |
| Calcination period (h) | 5 h | 4 h | 4 h | 4 h |
| Loading of alkaline earth oxides, x (wt %) | 19.2% | 20.8% | 10.4% | 10.7% |
| Improved supported catalyst produced | C 9 | C 10 | C 11 | C 12 |

WIM = Wet impregnation method
C 9 = $Ca_{0.2}SrO_{1.2}(19.2\%)/Nd_{0.2}LaO_{1.65}(21.1\%)/SS\ 5231$;
C 10 = $Ba_{0.01}SrO_{1.01}(20.8\%)/Yb_{0.2}LaO_{1.8}(22.4\%)/SA\ 5552$;
C 11 = $Mg_{0.1}SrO_{1.1}(10.4\%)/Ce_{0.02}LaO_{1.54}(19.9\%)/SA\ 5205$;
C 12 = $Ca_{0.1}SrO_{1.1}(18.7\%)/Sm_{0.1}LaO_{1.65}(27.5\%)/SA\ 5205$;

TABLE 4

Properties of the different sintered low surface area porous supports used in the preparation of improved supported catalysts in Examples 1–12; these supports are obtained from Norton Co., USA.

| Support | Shape | Composition | Surface area ($m^2 \cdot ga^{-1}$) | Pore volume ($cm^3 \cdot q^-$) | Porosity (%) |
|---|---|---|---|---|---|
| SA 5205 | spherical | $Al_2O_3(86.1\%)$, $SiO_2(11.8\%)$, $K_2O(0.6\%)$ $CaO(0.4\%)$, $MgO(0.4\%)$, $Na_2O(0.4\%)$, $Fe_2O_3(0.2\%)$, $ZrO_2 + HfO_2(<0.05\%)$ | <0.05 | 0.35 | 54 |
| SA 5218 | spherical | $Al_2O_3(86.1\%)$, $SiO_2(12.0\%)$, $CaO(0.6\%)$ $MgO(0.4\%)$, $K_2O(0.4\%)$, $TiO_2(0.2\%)$ $Na_2O(0.2\%)$, $Fe_2O_3(0.1\%)$, $ZrO_2(<0.05\%)$ | <0.05 | 0.25 | 48 |
| SA 5552 | rings | $Al_2O_3(93.1\%)$, $SiO_2(5.6\%)$, $Fe_2O_3(0.3\%)$ $MgO(0.3\%)$, $TiO_2(0.1\%)$, $CaO(0.1\%)$, $Na_2O(0.1\%)$, $K_2O(0.1\%)$, $HfO_2 + ZrO_2(<0.05\%)$ | <1.00 | 0.39 | 59 |
| SC 5232 | spherical | $SiC(65.8\%)$, $SiO_2(28.5\%)$, $Al_2O_3(4.7\%)$, $Fe_2O_3(0.3\%)$, $CaO(0.2\%)$, $MgO(0.1\%)$, $Na_2O(0.1\%)$, $K_2O(0.1\%)$, $ZrO_2 + HfO_2(<0.05\%)$ $TiO_2(0.01\%)$, leachable iron = 17 pas | <0.3 | 0.26 | 43 |

TABLE 4-continued

Properties of the different sintered low surface area porous supports used in the preparation of improved supported catalysts in Examples 1–12; these supports are obtained from Norton Co., USA.

| Support | Shape | Composition | Surface area ($m^2 \cdot g^{-1}$) | Pore volume ($cm^3 \cdot g^{-}$) | Porosity (%) |
|---|---|---|---|---|---|
| SS 5231 | spherical | $SiO_2$(95.0%), $Al_2O_3$(4.1%), $Fe_2O_3$(0.3%) $TiO_2$(0.2%), CaO(0.1%), MgO(0.1%), $Na_2O$(0.1%), $K_2O$(0.1%), $ZrO_2$ + $HfO_2$(<0.05%) | <0.4 | 0.25 | 35 |

TABLE 5

Results of the oxidative coupling of methane to higher hydrocarbons over the improved supported catalyst prepared in Examples 1–6

| Catalyst | $CH_4/O_2$ ratio in feed | $CH_4$ conversion (%) | Selectivity (%) for higher hydrocarbs $C_2$ | Selectivity (%) for higher hydrocarbs $C_{2+}$ | $C_2H_4/C_2H_6$ ratio in products | Productivity $C_2$-hydrocarbon (mmol $g^{-1}$ $h^{-}$) |
|---|---|---|---|---|---|---|
| C 1 (prepared in Example-1) | 8.0 | 20.5 | 73.5 | 78.6 | 0.8 | 309 |
| | 16.0 | 12.9 | 82.3 | 86.8 | 0.6 | 230 |
| | 20.0 | 11.0 | 84.8 | 90.4 | 0.5 | 204 |
| C 2 (prepared in Example-2) | 8.0 | 16.9 | 75.4 | 78.5 | 0.8 | 261 |
| | 16.0 | 10.6 | 82.6 | 87.1 | 0.5 | 190 |
| C 3 (prepared in Example-3) | 8.0 | 18.7 | 73.6 | 78.7 | 0.8 | 282 |
| | 16.0 | 12.3 | 82.9 | 89.6 | 0.6 | 221 |
| C 4 (prepared in Example-4) | 8.0 | 20.7 | 73.9 | 79.1 | 0.8 | 314 |
| | 16.0 | 13.1 | 81.4 | 86.7 | 0.6 | 231 |
| C 5 (prepared in Example-5) | 8.0 | 18.5 | 74.6 | 80.0 | 0.8 | 283 |
| | 16.0 | 11.3 | 83.1 | 87.8 | 0.5 | 203 |
| C 6 (prepared in Example-6) | 8.0 | 20.3 | 73.1 | 79.3 | 0.8 | 304 |
| | 16.0 | 11.9 | 82.4 | 87.5 | 0.6 | 212 |
| | 20.0 | 10.5 | 84.7 | 90.7 | 0.5 | 195 |

TABLE 6

Results of the oxidative coupling of methane to higher hydrocarbons over the improved supported catalyst prepared in Examples 7–12

| Catalyst | $CH_4/O_2$ ratio in feed | $CH_4$ conversion (%) | Selectivity (%) for higher hydrocarbs $C_2$ | Selectivity (%) for higher hydrocarbs $C_{2+}$ | $C_2H_4/C_2H_6$ ratio in products | Productivity $C_2$-hydrocarbon (mmol $g^{-1}$ $h^{-}$) |
|---|---|---|---|---|---|---|
| C 7 (prepared in Example-7) | 8.0 | 18.7 | 74.3 | 81.1 | 0.8 | 285 |
| | 16.0 | 10.3 | 83.2 | 90.2 | 0.5 | 186 |
| C 8 (prepared in Example-8) | 8.0 | 18.0 | 68.0 | 73.5 | 0.9 | 251 |
| | 16.0 | 10.6 | 73.5 | 78.4 | 0.6 | 169 |
| C 9 (prepared in Example-9) | 8.0 | 18.3 | 71.2 | 77.3 | 0.8 | 267 |
| | 16.0 | 11.5 | 78.4 | 82.5 | 0.6 | 195 |
| C 10 (prepared in Example-10) | 8.0 | 19.2 | 69.1 | 75.7 | 0.8 | 272 |
| | 16.0 | 10.4 | 79.3 | 84.3 | 0.7 | 179 |
| C 11 (prepared in Example-11) | 8.0 | 19.7 | 72.5 | 78.1 | 0.8 | 293 |
| | 16.0 | 12.1 | 80.3 | 84.4 | 0.6 | 210 |
| C 12 (prepared in Example-12) | 8.0 | 17.6 | 71.3 | 75.3 | 0.9 | 256 |
| | 16.0 | 9.5 | 75.7 | 82.5 | 0.5 | 156 |

TABLE 7

Results showing the time-on-stream activity and selectivity of the improved supported catalyst, C 1, prepared in Example-1 for the oxidative coupling of methane to higher hydrocarbons

| Time-on-stream (h) | $C_4$ conversion (%) | Selectivity (%) for higher hydrocarbons | | $C_2H_4/C_2H_6$ ratio in products |
|---|---|---|---|---|
| | | $C_2$ | $C_{2+}$ | |
| 1 | 10.9 | 84.3 | 90.1 | 0.51 |
| 16 | 10.6 | 84.6 | 90.3 | 0.50 |
| 48 | 11.0 | 83.1 | 89.8 | 0.52 |
| 101 | 10.8 | 83.3 | 90.0 | 0.51 |
| 152 | 11.2 | 83.0 | 89.0 | 0.53 |
| 207 | 10.9 | 83.7 | 90.1 | 0.52 |
| 314 | 10.7 | 84.7 | 91.3 | 0.50 |
| 416 | 11.0 | 83.2 | 89.9 | 0.52 |
| 512 | 10.8 | 84.6 | 90.7 | 0.51 |

TABLE 8

Results on the oxidative conversion of natural gas to ethylene and lower olefins over the improved supported catalyst, C 6, prepared in Example-6

| Reaction temp. (° C.) | Feed ratios | | GHSV of feed gases ($cm^3 \cdot g^{-1} \cdot h^{-1}$) | Conversion of carbon in NG to ethylene (%) | Selectivity (%) | |
|---|---|---|---|---|---|---|
| | $NG/O_2$ | $H_2O/NG$ | | | $C_2H_4$ | $C_{2+}$-olefins |
| 850 | 19.0 | 0.0 | 1,30,300 | 21.1 | 75.2 | 83.4 |
| 850 | 13.1 | 0.0 | 2,52,800 | 16.3 | 67.3 | 84.2 |
| 850 | 15.3 | 0.0 | 2,52,800 | 15.8 | 68.9 | 84.7 |
| 845 | 18.4 | 0.0 | 2,52,800 | 15.1 | 69.2 | 86.1 |
| 850 | 15.3 | 1.0 | 1,52,700 | 19.7 | 74.7 | 85.8 |

TABLE 9

Results on the oxidative dehydrogenation of ethane over the improved supported catalyst, C 1, prepared in Example-1

| Reaction temp. (° C.) | Feed ratios | | GHSV of feed gases ($cm^3 \cdot g^{-1} \cdot h^{-1}$) | Ethane conversion (%) | Selectivity (%) | | | Productivity of ethylene (mmol $g^{-1}$) |
|---|---|---|---|---|---|---|---|---|
| | $C_2H_6/O_2$ | $C_2H_6/H_2O$ | | | $C_2H_4$ | $C_{2+}$-olefins | $CO_x$ | |
| 750 | 3.0 | 0.6 | 18,900 | 60.1 | 74.1 | 77.5 | 16.1 | 124 |
| 850 | 3.0 | 0.6 | 18,900 | 89.2 | 70.3 | 74.1 | 15.7 | 175 |
| 800 | 4.0 | 0.7 | 18,900 | 70.3 | 73.5 | 78.6 | 12.1 | 157 |
| 850 | 4.0 | 0.7 | 18,900 | 80.1 | 75.1 | 80.2 | 11.3 | 183 |
| 850 | 8.0 | 0.7 | 18,900 | 77.2 | 82.3 | 87.6 | 6.1 | 209 |
| 800 | 8.0 | 0.7 | 18,900 | 58.3 | 83.4 | 88.1 | 7.2 | 160 |
| 850 | 8.0 | 0.6 | 61,400 | 73.5 | 81.2 | 86.7 | 5.9 | 589 |
| 800 | 8.0 | 0.6 | 61,400 | 51.3 | 85.5 | 88.2 | 6.1 | 433 |
| 850 | 8.0 | 1.0 | 1,02,000 | 65.2 | 84.9 | 88.4 | 6.2 | 1159 |
| 850 | 8.0 | 0.8 | 1,50,990 | 58.9 | 83.7 | 87.5 | 7.0 | 1362 |
| 860 | 8.0 | 1.3 | 1,97,400 | 51.5 | 84.1 | 87.6 | 6.5 | 1985 |
| 850 | 6.0 | 0.8 | 1,60,400 | 65.6 | 81.2 | 83.9 | 9.3 | 1575 |

TABLE 10

Details of the preparation of improved supported catalyst in Examples 17 to 19

|  | Example 17 | Example 18 | Example 19 |
|---|---|---|---|
| Support used | SA 5205 | SA 5205 | SA 5205 |
| Shape and size of support | 1mm granules | 2mm granules | 6mm spheres |
| Precoating of the support with rare earth oxides | | | |
| Precursor compound of La | La - nitrate | La - nitrate | La - nitrate |
| Precursor compound of R | Nd - nitrate | ND - nitrate | Sm - nitrate |
| R/La mole ratio | 1.0 | 0.1 | 0.1 |
| Decomposition temp. (° C.) | 500° C. | 500° C. | 600° C. |
| Decomposition atmosphere | Air | Air | Air |
| Decomposition period (h) | 4 h | 4 h | 4 h |
| Calcination temp. (° C.) | 900° C. | 930° C. | 850° C. |
| Calcination atmosphere | Air | Air | Air |
| Calcination period (h) | 6 h | 4 h | 10 h |
| Loading of rare earth oxides, y (wt %) | 18.6% | 18.0% | 14.7% |
| Deposition of alkaline earth metal oxides on precoated support | | | |
| Precursor compound of Sr | Sr - nitrate | Sr - nitrate | Sr - nitrate |
| Precursor compound of A | Mg - nitrate | Mg - nitrate | Ca - nitrate |
| A/Sr mole ratio | 1.0 | 0.1 | 0.1 |
| Decomposition temp. (° C.) | 600° C. | 500° C. | 450° C. |
| Decomposition atmosphere | Air | Air | Air |
| Decomposition period (h) | 2 h | 5 h | 6 h |
| Calcination temp. (° C.) | 900° C. | 930° C. | 950° C. |
| Calcination atmosphere | Air | Air | Air |
| Calcination period (h) | 6 h | 4 h | 3 h |
| Loading of alkaline earth oxides, x (wt %) | 12.4% | 26.4% | 14.1% |
| Improved supported catalyst produced | C 1 | C 2 | C 3 |

C 1 = $MgSrO_2(12.4\%)/NdLaO_3(18.6\%)/SA\ 5205$;
C 2 = $Mg_{0.1}SrO_{1.1}(26.4\%)/Nd_{0.1}LaO_{1.65}(18.0\%)/SA\ 5205$;
C 3 = $Ca_{0.1}SrO_{1.1}(14.1\%)/Sm_{0.1}LaO_{1.65}(14.7\%)/SA\ 5205$;

TABLE 11a

Results on the oxidative conversion of ethane to ethylene and higher hydrocarbons over the improved catalyst C-1 prepared in Example-17, with different catalyst diluent/catalyst (vol/vol) ratios at different process conditions

| Catalyst diluent | Catalyst diluent/ catalyst ratio (v/v) | Reaction temp. (° C.) | Feed ratios $C_2H_6/O_2$ (mol/mol) | Feed ratios $C_2H_6/H_2O$ (mol/mol) | GHSV of feed gases ($cm^3 \cdot g^{-1} \cdot h^{-1}$) | $C_2H_6$ conversion (%) | Selectivity (%) for $C_2H_4$ | $C_{3+4}$ olefins | $C_{3+4}$ alkenes | $CH_4$ | CO | $CO_2$ | productivity of ethylene (mol·$g^{-1}$ catalyst·$h^{-1}$) | Net heat of reaction, $H_7$ (Kcal·$mol^{-1}$ of $C_2H_6$ converted) |
|---|---|---|---|---|---|---|---|---|---|---|---|---|---|---|
| Quarts | 8.1 | 850 | 7.94 | 1.00 | 1,01,45 | 47.5 | 86.7 | 3.16 | 1.18 | 4.17 | 2.46 | 2.29 | 962 | +6.37 |
| | | 800 | 7.94 | 1.00 | 1407 | 35.8 | 86.1 | 2.35 | 1.61 | 4.21 | 1.09 | 4.61 | 9.19 | -7.91 |
| | | 850 | 7.94 | 1.00 | 1407 | 60.7 | 83.3 | 3.21 | 8.16 | 7.35 | 2.39 | 3.61 | 14.93 | +6.50 |
| | | 800 | 7.80 | 0.95 | 692 | 48.7 | 81.2 | 2.84 | 8.60 | 6.23 | 4.13 | 4.97 | 5.62 | -7.95 |
| SA 5205 | 2.4 | 850 | 7.94 | 1.00 | 5217 | 76.2 | 83.2 | 3.88 | 8.14 | 7.01 | 1.88 | 3.87 | 69.48 | +13.45 |
| | | 800 | 7.94 | 1.00 | 5217 | 44.8 | 85.8 | 2.37 | 1.72 | 4.33 | 1.72 | 4.04 | 42.88 | +1.88 |
| SA 5205 | 12.2 | 850 | 7.94 | 1.00 | 28,878 | 59.3 | 85.9 | 3.86 | 0.23 | 5.86 | 2.82 | 2.89 | 251 | +12.37 |
| | | 850 | 7.75 | 1.93 | 10,160 | 85.2 | 79.1 | 4.15 | 0.89 | 11.18 | 2.89 | 2.62 | 199 | +18.77 |
| | | 850 | 4.50 | 1.83 | 28,543 | 77.9 | 78.9 | 3.42 | 0.28 | 7.28 | 3.98 | 6.21 | 285 | +7.49 |
| | | 850 | 11.94 | 1.82 | 29,655 | 79.8 | 86.8 | 4.82 | 0.21 | 6.39 | 0.98 | 1.61 | 272 | +11.37 |
| SA 5205 | 42.5 | 850 | 7.94 | 1.00 | 69,565 | 81.5 | 82.7 | 4.84 | 0.29 | 7.96 | 2.29 | 1.91 | 981 | +12.73 |
| | | 850 | 7.82 | 0.32 | 67,965 | 84.6 | 84.3 | 3.75 | 0.07 | 7.81 | 1.64 | 3.33 | 498 | +15.29 |
| | | 850 | 20.00 | 1.06 | 63,199 | 77.2 | 86.9 | 5.21 | 0.27 | 6.00 | 0.54 | 1.11 | 1836 | +24.41 |
| SA 5205 | 130.0 | 850 | 7.94 | 1.00 | 2,06,700 | 76.5 | 84.7 | 4.85 | 0.22 | 6.19 | 2.85 | 1.15 | 2837 | +14.64 |
| | | 850 | 7.95 | 2.89 | 2,06,700 | 76.2 | 83.9 | 5.17 | 0.20 | 7.07 | 2.73 | 0.97 | 1050 | +12.21 |

TABLE 11b

Results on the oxidative conversion of ethane to ethylene and higher hydrocarbons over the improved catalyst C-2 and C-3 prepared in Example-18 and 19 respectively, with different catalyst diluent/catalyst (vol/vol) ratios at different process conditions

| Catalyst diluent | Catalyst diluent/ catalyst ratio (v/v) | Reaction temp. (°C.) | Feed ratios (mol/mol) $C_2H_6/O_2$ | $C_2H_6/H_2O$ | GHSV of feed gases ($cm^3 \cdot g^{-1} \cdot h^{-1}$) | $C_2H_6$ conversion (%) | $C_2H_4$ | Selectivity (%) for $C_{3+4}$ olefins | $C_{3+4}$ alkenes | $CH_4$ | CO | $CO_2$ | productivity of ethylene ($mol \cdot g^{-1}$ catalyst $\cdot h^{-1}$) | Net heat of reaction, $H_7$ ($Kcal \cdot mol^{-1}$ of $C_2H_6$ converted) |
|---|---|---|---|---|---|---|---|---|---|---|---|---|---|---|
| A) Improved supported catalyst C-2, prepared in Example-18 | | | | | | | | | | | | | | |
| SA 5205 | 57.8 | 800 | 6.30 | 0.93 | 1,02,200 | 55.1 | 86.4 | 2.02 | 0.89 | 4.45 | 3.41 | 2.05 | 977 | −5.52 |
|  |  | 850 | 6.30 | 0.93 | 1,02,200 | 81.7 | 81.2 | 3.68 | 0.22 | 7.19 | 4.82 | 2.34 | 1362 | +5.46 |
|  |  | 800 | 7.30 | 0.95 | 1,02,200 | 59.3 | 83.7 | 1.94 | 0.65 | 6.81 | 4.55 | 2.31 | 1042 | +1.54 |
|  |  | 850 | 7.30 | 0.95 | 1,02,200 | 82.5 | 80.9 | 3.52 | 0.22 | 7.92 | 4.83 | 2.56 | 1401 | +2.46 |
|  |  | 800 | 8.00 | 0.96 | 1,02,200 | 51.2 | 85.2 | 1.40 | 1.01 | 4.34 | 5.64 | 2.36 | 918 | +5.86 |
| SA 5205 | 65.0 | 800 | 6.30 | 1.82 | 1,50,650 | 46.0 | 83.1 | 2.30 | 1.91 | 3.90 | 6.20 | 2.83 | 1517 | −6.33 |
|  |  | 850 | 6.30 | 1.84 | 1,50,650 | 75.6 | 81.1 | 4.79 | 0.19 | 5.42 | 5.88 | 2.83 | 2430 | +2.56 |
|  |  | 800 | 7.30 | 1.85 | 1,52,700 | 48.9 | 85.6 | 2.02 | 1.15 | 4.11 | 5.01 | 2.83 | 1712 | +0.99 |
| B) Improved supported catalyst C-3, prepared in Example-19. | | | | | | | | | | | | | | |
| SA 5205 | 0.5 | 800 | 8.06 | 0.68 | 18,815 | 56.5 | 81.2 | 2.63 | 1.74 | 5.33 | 2.80 | 5.33 | 150 | −0.40 |
|  |  | 850 | 7.40 | 0.70 | 19,710 | 75.1 | 82.1 | 5.10 | 0.40 | 7.50 | 3.20 | 3.52 | 201 | +6.66 |

TABLE 12

Details of the preparation of improved supported catalyst, Examples 21–25

|  | Example 21 | Example 22 | Example 23 | Example 24 | Example 25 |
|---|---|---|---|---|---|
| Support used | SA 5205 | SA 5205 | SA 5205 | SA 5205 | SA 5205 |
| Shape and size of support | 6mm spheres | 1mm granules | 2mm granules | 6mm spheres | 1mm granules |
| Precoating of the support with rare earth oxides | | | | | |
| Precursor compound of La | La - nitrate | La - nitrate | La - nitrate | La - nitrate | La - nitrate |
| Precursor compound of R | Nd - nitrate | Nd - nitrate | Nd - nitrate | Sm - nitrate | Nd - nitrate |
| R/La mole ratio | 0.1 | 0.1 | 1.0 | 1.0 | 1.0 |
| Decomposition temp. (°C.) | 500° C. | 500° C. | 550° C. | 600° C. | 500° C. |
| Decomposition atmosphere | Air | Air | Air | Air | Air |
| Decomposition period (h) | 4 h | 4 h | 3 h | 4 h | 4 h |
| Calcination temp. (°C.) | 930° C. | 950° C. | 900° C. | 850° C. | 900° C. |
| Calcination atmosphere | Air | Air | Air | Air | Air |
| Calcination period (h) | 4 h | 4 h | 5 h | 10 h | 6 h |
| Loading of rare earth oxides, y (wt %) | 18.0% | 17.6% | 16.9% | 15.7% | 18.6% |
| Deposition of alkaline earth metal oxides on precoated support | | | | | |
| Precursor compound of Sr | Sr - nitrate | Sr - nitrate | Sr - nitrate | Sr - nitrate | Sr - nitrate |
| Precursor compound of A | Mg - nitrate | Mg - nitrate | Mg - nitrate | Ca - nitrate | Mg - nitrate |
| A/Sr mole ratio | 0.1 | 1.0 | 0.1 | 0.1 | 1.0 |
| Decomposition temp. (°C.) | 500° C. | 490° C. | 500° C. | 450° C. | 600° C. |
| Decomposition atmosphere | Air | Air | Air | Air | Air |
| Decomposition period (h) | 5 h | 7 h | 4 h | 6 h | 2 h |
| Calcination temp. (°C.) | 930° C. | 900° C. | 900° C. | 950° C. | 900° C. |
| Calcination atmosphere | Air | Air | Air | Air | Air |
| Calcination period (h) | 4 h | 4 h | 4 h | 3 h | 6 h |
| Loading of alkaline earth oxides, x (wt %) | 26.4% | 13.2% | 10.0% | 11.1% | 12.4% |
| Improved supported catalyst produced | C 1 | C 2 | C 3 | C 4 | C 5 |

C 1 = $Mg_{0.1}SrO_{1.1}(26.4\%)/Nd_{0.1}LaO_{1.65}(18.0\%)/SA\ 5205$;
C 2 = $MgSrO_2(13.2\%)/Nd_{0.1}LaO_{1.65}(17.6\%)/SA\ 5205$;
C 3 = $Mg_{1.1}SrO_{1.1}(10.0\%)/NdLaO_3(16.9\%)/SA\ 5205$;
C 4 = $Ca_{0.1}SrO_{1.1}(11.1\%)/SmLaO_3(15.7\%)/SA\ 5205$;
C 5 = $MgSrO_2(12.4\%)/NdLaO_3\text{-}(18.6\%)/SA\ 5205$;

TABLE 13

Results on the oxidative conversion of methane to ethylene, ethane or higher hydrocarbons ($C_{2+}$-hydrocarbons) over the improved catalyst prepared in Examples 21 to 25, with catalyst diluent/catalyst ratio of 1.0 (v/v), at different process conditions

| Catalyst diluent | Reaction temp. (°C.) | Feed ratios $CH_4/O_2$ | Feed ratios $CH_4/H_2O$ | GHSV of feed gases (cm$^3$.g$^{-1}$.catalyst.h$^{-}$) | $CH_4$ conversion (%) | Selectivity (%) $C_2$ | Selectivity (%) $C_{2+}$ | Selectivity (%) $CO_x$ | $CO/CO_2$ ratio in products | $C_2H_4/C_2H_6$ ratio in products (mol/mol) | productivity (mmol.g$^{-1}$.catalyst.h$^{-1}$) $C_2$ | productivity $C_2H_4$ |
|---|---|---|---|---|---|---|---|---|---|---|---|---|
| A) Catalyst: Improved supported catalyst C-1 prepared in Example-21 | | | | | | | | | | | | |
| SA 5205 | 805 | 17.0 | 10.0 | 56,500 | 11.9 | 82.6 | 87.2 | 12.8 | 0.34 | 0.42 | 107 | 32.1 |
|  | 850 | 17.0 | 10.0 | 56,500 | 12.6 | 83.5 | 88.6 | 11.4 | 0.31 | 0.56 | 114 | 40.9 |
|  | 850 | 20.0 | 10.0 | 56,500 | 10.7 | 84.9 | 90.2 | 9.88 | 0.30 | 0.56 | 100 | 33.3 |
|  | 850 | 18.5 | 10.0 | 1,03,200 | 11.4 | 83.2 | 88.9 | 11.1 | 0.94 | 0.56 | 190 | 63.3 |
|  | 850 | 4.0 | 10.0 | 1,03,200 | 39.4 | 80.1 | 65.2 | 34.8 | 0.33 | 1.10 | 311 | 163.0 |
| B) Catalyst: Improved supported catalyst C-2 prepared in Example-22 | | | | | | | | | | | | |
| Quarts | 850 | 8.0 | 10.0 | 1,03,200 | 21.0 | 71.2 | 76.0 | 24.0 | 0.40 | 0.82 | 202 | 127.1 |
|  | 850 | 16.0 | 10.0 | 1,03,200 | 12.3 | 81.6 | 86.1 | 13.9 | 0.60 | 0.53 | 199 | 68.9 |
|  | 850 | 70.0 | 10.0 | 1,03,200 | 11.3 | 82.6 | 88.9 | 11.3 | 0.60 | 0.53 | 187 | 84.8 |
| C) Catalyst: Improved supported catalyst C-3 prepared in Example-23 | | | | | | | | | | | | |
| SA 5205 | 850 | 10.0 | 100.0 | 1,03,200 | 12.3 | 10.9 | 85.8 | 14.2 | 0.37 | 0.57 | 213 | 77.3 |
|  | 850 | 24.0 | 100.0 | 1,03,200 | 10.0 | 15.8 | 90.1 | 9.9 | 0.39 | 0.47 | 188 | 60.1 |
| D) Catalyst: Improved supported catalyst C-4 prepared in Example-24 | | | | | | | | | | | | |
| SA 5205 | 850 | 16.0 | 19.0 | 1,03,200 | 11.4 | 82.8 | 87.6 | 12.4 | 0.55 | 0.54 | 187 | 65.6 |
|  | 850 | 20.0 | 10.0 | 1,03,200 | 10.4 | 83.8 | 88.05 | 11.5 | 0.68 | 0.52 | 175 | 59.9 |
| E) Catalyst: Improved supported catalyst C-5 prepared in Example-25 | | | | | | | | | | | | |
| SA 5205 | 850 | 15.4 | 3.3 | 2,32,760 | 10.7 | 83.2 | 87.4 | 12.6 | 0.26 | 0.52 | 312 | 117.0 |
|  | 890 | 15.4 | 3.3 | 2,32,760 | 12.3 | 81.6 | 84.8 | 15.2 | 0.70 | 0.70 | 336 | 144.8 |
|  | 850 | 15.4 | 1.0 | 2,31,960 | 7.1 | 85.7 | 90.4 | 11.6 | 0.43 | 0.37 | 132 | 35.6 |

TABLE 14

Results on the oxidative conversion of methane to ethylene, ethane or higher hydrocarbons ($C_{2+}$-hydrocarbons) over the improved catalyst prepared in Examples 23 and 25, with catalyst diluent/catalyst ratio of 27.0 (v/v), at different process conditions

| Reaction temp. (°C.) | Feed ratios $CH_4/O_2$ | Feed ratios $CH_4/H_2O$ | GHSV of feed gases (cm$^3$.g$^{-1}$.catalyst.h$^{-}$) | $CH_4$ conversion (%) | Selectivity (%) $C_2$ | Selectivity (%) $C_{2+}$ | Selectivity (%) $CO_x$ | $CO/CO_2$ ratio in products | $C_2H_4/C_2H_6$ ratio in products (mol/mol) | productivity (mmol.g$^{-1}$.catalyst.h$^{-1}$) $C_2$ | productivity $C_2H_4$ |
|---|---|---|---|---|---|---|---|---|---|---|---|
| A) Catalyst: Improved supported catalyst C-3 prepared in Example-23 | | | | | | | | | | | |
| 850 | 15.4 | 3.3 | 1,16,500 | 9.4 | 82.2 | 86.2 | 13.8 | 0.41 | 0.65 | 149 | 52.9 |
| 880 | 15.4 | 3.3 | 1,16,500 | 11.3 | 81.2 | 85.3 | 14.7 | 0.37 | 0.83 | 177 | 80.3 |
| 880 | 15.4 | 0.91 | 1,20,100 | 9.9 | 82.6 | 87.0 | 13.0 | 0.23 | 0.74 | 162 | 68.9 |
| B) Catalyst: Improved supported catalyst C-5 prepared in Example-25 | | | | | | | | | | | |
| 850 | 15.4 | 3.3 | 1,16,500 | 11.5 | 81.1 | 85.7 | 14.3 | 0.44 | 0.68 | 180 | 72.9 |
| 890 | 15.4 | 3.3 | 1,16,500 | 12.2 | 83.2 | 87.7 | 12.3 | 0.35 | 1.00 | 195 | 97.5 |
| 890 | 21.5 | 3.3 | 1,16,500 | 10.2 | 84.0 | 88.0 | 12.9 | 0.49 | 1.00 | 167 | 83.5 |
| 890 | 15.4 | 0.81 | 1,20,100 | 12.2 | 82.3 | 86.6 | 14.5 | 0.27 | 1.00 | 124 | 62.0 |

TABLE 15

Results on the oxidative conversion of natural gas (NG) to ethylene and higher hydrocarbons over the improved catalyst prepared in Example-25, with different catalyst diluent/catalyst ratios at different process conditions

| Catalyst diluent/ catalyst ratio (v/v) | Reaction temp. (° C.) | Feed ratios (mol/mol) | | GHSV of feed gases (cm$^3$.g$^{-1}$. catalyst. h$^{-1}$) | Conversion of carbon in NG (mol %) | Selectivity (%) for | | | | productivity of ethylene (mmol.g$^{-1}$. catalyst. h$^{-1}$) | Net heat of reaction, H$_7$ (Kcal.mol$^{-1}$ of carbon converted) |
|---|---|---|---|---|---|---|---|---|---|---|---|
| | | NG/O$_2$ | NG/H$_2$O | | | C$_2$H$_4$ | olefins | CO | CO$_2$ | | |
| 1.0 | 850 | 15.5 | 1.0 | 2,02,570 | 18.9 | 66.8 | 88.4 | 4.8 | 6.8 | 381 | −3.46 |
| 1.0 | 890 | 15.5 | 1.0 | 2,02,570 | 21.4 | 69.9 | 85.8 | 5.4 | 8.8 | 364 | −4.96 |
| 1.0 | 850 | 15.0 | 2.5 | 3,59,450 | 14.8 | 60.8 | 90.5 | 5.3 | 4.2 | 550 | −2.54 |
| 57.0 | 860 | 19.0 | 2.5 | 1,83,600 | 20.8 | 63.6 | 81.9 | 6.7 | 11.4 | 407 | −16.31 |
| 57.0 | 860 | 15.0 | 2.5 | 1,79,520 | 19.7 | 64.5 | 82.2 | 9.5 | 8.0 | 388 | −4.64 |
| 57.0 | 850 | 20.0 | 1.0 | 1,02,710 | 21.2 | 64.5 | 86.5 | 5.2 | 8.2 | 176 | −4.40 |

We claim:

1. A process for the oxidative conversion of methane or natural gas to ethylene, ethane and higher hydrocarbons, operating in a most energy efficient and safe manner by allowing the endothermic hydrocarbon cracking reactions to occur simultaneously with the exothermic hydrocarbon oxidation reactions in a fixed diluted-catalyst bed reactor, using an improved supported catalyst, containing mixed strontium and other alkaline earth oxides deposited on a sintered low surface area porous inert support precoated with mixed lanthanum and other rare earth oxides, represented by the general formula:

$$A_a SrO_b \text{ (x)}/R_c LaO_d \text{ (y)}/S,$$

wherein, A is alkaline earth element selected from Be, Mg, Ca, Ba or a mixture thereof; Sr is strontium; O is oxygen; R is rare earth element selected from Ce, Nd, Pm, Sm, Eu, Gd, Tb, Dy, Ho, Er, Tm, Yb, Lu or a mixture thereof; La is lanthanum; S is catalyst support selected from sintered low surface area porous refractory inert solids comprising of alumina, silica, silica-alumina, silicon carbide, zirconia, hafnia or a mixture thereof; a is A/Sr mole ratio in the range of about 0.01 to about 10; b is number of oxygen atoms needed to fulfill the valence requirement of alkaline earth elements (A$_a$ Sr); c is R/La mole ratio in the range of about 0.01 to about 10; d is number of oxygen atoms needed to fulfill the valence requirement of rare earth elements, (R$_c$La); y is weight percent loading of rare earth oxides (R$_c$LaO$_d$) precoated on the support in the range of about 0.5 wt % to about 50 wt % and x is wt % loading of alkaline earth oxides (A$_a$SrO$_b$) deposited on the precoated support in the range of about 0.4 wt % to about 40 wt % which is prepared by coating said support with the rare earth oxides (R$_c$LaO$_d$) and then depositing the alkaline earth oxides (A$_a$SrO$_b$) on the precoated support, the catalyst is diluted with an inert porous or non-porous refractory solid comprising of fused or highly sintered alumina, magnesia, silica, silica-alumina, silicon carbide, calcium oxide, zirconia, hafnia or a mixture thereof, in order to provide larger heat transfer area for the removal of heat of the exothermic hydrocarbon oxidation reactions and also larger contact time in the vicinity of the catalyst for the endothermic thermal hydrocarbon cracking reactions which utilize instantly the heat produced in the exothermic reactions, making the process most energy efficient and also making it lesser exothermic and hence more safer, in the presence of oxygen and steam in the feed the process comprises:

(a) mixing oxygen with methane or natural gas at ambient temperature or below its ignition temperature, (b) preheating steam and the mixture of oxygen and methane or natural gas to a temperature between about 550° C. and about 850° C., (c) admixing said preheated steam with said preheated mixture of oxygen and methane or natural gas, (d) passing continuously the resulting admixture feed over the said improved supported catalyst diluted with the said inert solid with the volume ratio of catalyst diluent to catalyst between about 0.5 and about 500 in a fixed reactor, maintaining the mole ratio of organic carbon to oxygen and steam in said admixture feed between about 3 and about 90 and between about 0.1 and about 100, respectively, a gas hourly space velocity of said admixture feed between about 5×10$^3$ cm$^3$g$^{-1}$ catalyst.g$^{-1}$ and about 1×10$^6$ cm$^3$.g$^{-1}$ catalyst.h$^1$, a reaction temperature between about 700° C. and about 1000° C. and a pressure between about 1 atm and about 50 atm and separating the components of effluent produce gases by known methods and recycling the unconverted reactants.

2. A process as claimed in claim 1, wherein the reaction temperature is between about 800° C. and about 900° C.

3. A process as claimed in claim 1, wherein the pressure employed ranges from about 1.2 atm to about 12 atm.

4. A process as claimed in claim 1, wherein the mole ratio of organic carbon to oxygen and steam in feed ranges from about 4 to about 40 and about 0.2 to about 20, respectively.

5. A process as claimed in claim 2, wherein the gas hourly space velocity of feed ranges from about 1×10$^4$ cm$^3$.g$^{-1}$ catalyst.h$^{-1}$ to about 5×10$^5$ cm$^3$.g$^{-1}$ catalyst.h$^{-1}$.

6. A process as claimed in claim 2, wherein the catalyst and the catalyst diluent have similar shape and size and are distributed uniformly in the fixed bed reactor.

7. A process as claimed in claim 1, wherein the catalyst diluent is in a form of granules, spherical or cylindrical pellets, extrudes, rings, saddles, or star shaped objects.

8. A process as claimed in claim 1, wherein the volume ratio of catalyst diluent to catalyst ranges from about 1 to about 100.

9. A process as claimed in claim 1, wherein for the improve supported catalyst, the alkaline earth element A is Mg, Ca or a mixture thereof; the rare earth element R is Ce, Nd, Sm, Eu, Gd, Yb or a mixture thereof; the A/Sr mole ratio, a, ranges from about 0.01 to about 1.0; the R/La mole ratio, c, ranges from about 0.01 to about 1.0; the loading of alkaline earth oxides, x, ranges from about 2.5 wt % to about 25 wt %; the loading of rare earth oxides, y, ranges from about 3 wt % to about 30%; the support, S, is in the form of granules of size in the range of about 0.1 mm to about 8 mm or in the form of spherical or cylindrical pellets, extrudes, rings, saddles or star of diameter or size in the range of about 1 mm to about 15 mm and has surface area, pore volume and porosity in the range of about 0.001 $m^2.g^{-1}$ to about 5.0 $m^2.g^{-1}$, about 0.02 $cm^3.g^{-1}$ to about 0.6 $cm^3.g^{-1}$ and about 5% to about 75%, respectively.

10. A process for the oxidative conversion of ethane or $C_2$–$C_4$ paraffins to ethylene, propylene and/or butylene, operating in a most energy efficient and safe manner by allowing the endothermic hydrocarbon cracking reactions to occur simultaneously with the exothermic hydrocarbon oxidation reactions in a fixed diluted-catalyst bed reactor in the presence of free oxygen and steam, using the improved supported catalyst, containing mixed strontium and other alkaline earth oxides deposited on a sintered low surface area porous inert support precoated with mixed lanthanum and other rare earth oxides, represented by the general formula:

$$A_aSrO_b\,(x)/R_cLaO_d(y)/S,$$

wherein, A is alkaline earth element selected from Be, Mg, Ca, Ba or a mixture thereof; Sr is strontium; O is oxygen, R is rare earth element selected from Ce, Nd, Pm, Sm, Eu, Gd, Tb, Dy, Ho, Er, Tm, Yb, Lu or a mixture thereof; La is lanthanum; S is catalyst support selected from sintered low surface area porous refractory inert solids comprising of alumina, silica, silica-alumina, silicon carbide, zirconia, hafnia or a mixture thereof; a is A/Sr mole ratio in the range of about 0.01 to about 10; b is number of oxygen atoms needed to fulfill the valence requirement of alkaline earth elements ($A_a$ Sr); c is R/La mole ratio in the range of about 0.01 to about 10; d is number of oxygen atoms needed to fulfill the valence requirement of rare earth elements, ($R_c$La); y is weight percent loading of rare earth oxides ($R_cLaO_d$) precoated on the support in the range of about 0.5 wt % to about 50 wt % and x is wt % loading of alkaline earth oxides ($A_aSrO_b$) on the precoated support in the range of about 0.4 wt % to about 40 wt %, by the said catalyst is diluted with an inert porous or non-porous refractory solid comprising of fused or highly sintered alumina, magnesia, silica, silica-alumina, silicon carbide, calcium oxide, zirconia, hafnia or a mixture thereof, the process comprises:

(a) mixing of oxygen or air with enriched oxygen and ethane or $C_2$–$C_4$ paraffins at ambient temperature or below its ignition temperature, (b) preheating steam and the mixture of oxygen or air enriched with oxygen and ethane or $C_2$–$C_4$ paraffins to a temperature between about 550° C. and about 850° C., (c) admixing said preheated steam with said preheated mixture of oxygen or air enriched with oxygen and ethane or $C_2$–$C_4$ paraffins, (d) passing continuously the resulting admixture feed over the said improved supported catalyst diluted with the said inert solid with the volume ratio of catalyst diluent to catalyst between about 0.05 and about 500 in a fixed bed reactor, maintaining the mole ratio of hydrocarbon to oxygen and steam in said admixture feed between about 2.5 and about 75 and between about 0.1 and about 10, respectively, a gas hourly space velocity of said admixture feed between about $5 \times 10^2$ $cm^3.g^{-1}$ catalyst.$h^{-1}$ and about $6 \times 10^5$ $cm^3.g^{-1}$ catalyst.$h^{-1}$, a reaction temperature between about 600° C. and about 1000° C. and a pressure between about 0.5 atm and about 7.5 atm and cooling and separating the components of effluent produce gases by known methods and recycling the unconverted reactants.

11. A process claimed in claim 10, wherein the reaction temperature is between about 700° C. and about 900° C.

12. A process claimed in claim 10, wherein the pressure employed ranges from about 1.0 atm to about 5 atm.

13. A process claimed in claim 10, wherein the mole ratio of hydrocarbon to oxygen and steam in feed ranges from about 3 to about 30 and about 0.3 to about 3, respectively.

14. A process claimed in claim 10, wherein the gas hourly space velocity of feed ranges from about $1 \times 10^3$ $cm^3.g^{-1}$ catalyst.$h^{-1}$ to about $3 \times 10^5$ $cm^3.g^{-1}$ catalyst.$h^{-1}$.

15. A process claimed in claim 10, wherein the catalyst and the catalyst diluent have similar shape and size and are distributed uniformly in the fixed bed reactor.

16. A process as claimed in claim 10, wherein the catalyst diluent is in a form of granules, spherical or cylindrical pellets, extrudes, rings, saddles or star shaped objects.

17. A process claimed in claim 10, wherein the volume ratio of catalyst diluent to catalyst ranges from about 0.1 to about 150.

18. A process claimed in claim 10, wherein for the improved supported catalyst, the alkaline earth element A is Mg, Ca or a mixture thereof; the rare earth element R is Ce, Nd, Sm, Eu, Gd, Yb or a mixture thereof; the A/Sr mole ratio, a ranges from about 0.01 to about 1.0; the R/La mole ratio, c, ranges from about 0.01 to about 1.0, the loading of alkaline earth oxides x, ranges from about 2.5 wt % to about 25 wt %; the loading of rare earth oxides, y, ranges from about 3 wt % to about 30 wt %; the support, s, is in the form of granules of size in the range of about 0.1 mm to about 8 mm or in the form of spherical or cylindrical pellets, extrudes, rings, saddles or star of diameter or size in the range of about 1 mm to about 15 mm and has surface area, pore volume and porosity in the range of about 0.001 $m^2.g^{-1}$ to about 5.0 $m^2.g^{-1}$, about 0.02 $cm^3.g^{-1}$ to about 0.6 $cm^3.g^{-1}$ and about 5% to about 75%, respectively.

* * * * *